United States Patent
Venkatachalam et al.

(10) Patent No.: US 8,663,849 B2
(45) Date of Patent: Mar. 4, 2014

(54) METAL HALIDE COATINGS ON LITHIUM ION BATTERY POSITIVE ELECTRODE MATERIALS AND CORRESPONDING BATTERIES

(75) Inventors: Subramanian Venkatachalam, Pleasanton, CA (US); Deepak Kumaar Kandasamy Karthikeyan, Foster City, CA (US); Herman A. Lopez, Sunnyvale, CA (US)

(73) Assignee: Envia Systems, Inc., Newark, CA (US)

( * ) Notice: Subject to any disclaimer, the term of this patent is extended or adjusted under 35 U.S.C. 154(b) by 600 days.

(21) Appl. No.: 12/888,131

(22) Filed: Sep. 22, 2010

(65) Prior Publication Data
US 2012/0070725 A1 Mar. 22, 2012

(51) Int. Cl.
*H01M 4/52* (2010.01)
*H01M 4/485* (2010.01)
*H01M 4/42* (2006.01)
*H01M 4/58* (2010.01)
*H01M 10/24* (2006.01)
*H01M 4/02* (2006.01)
*B05D 5/12* (2006.01)

(52) U.S. Cl.
USPC ............... 429/231.95; 429/231.6; 429/229; 429/231.5; 429/221; 429/231.2; 427/126.1

(58) Field of Classification Search
USPC ........... 429/188, 231.95, 231.6, 229, 231.5, 429/221, 231.2, 126.1, 126, 7
See application file for complete search history.

(56) References Cited

U.S. PATENT DOCUMENTS

| | | |
|---|---|---|
| 5,658,693 A | 8/1997 | Thackeray et al. |
| 5,674,645 A | 10/1997 | Amatucci et al. |
| 6,037,095 A | 3/2000 | Miyasaka |
| 6,087,042 A | 7/2000 | Sugiyama et al. |
| 6,168,887 B1 | 1/2001 | Dahn et al. |
| 6,183,718 B1 | 2/2001 | Barker et al. |
| 6,248,477 B1 | 6/2001 | Howard, Jr. et al. |
| 6,251,822 B1 | 6/2001 | Peng et al. |
| 6,322,744 B1 | 11/2001 | Kelley et al. |
| 6,372,385 B1 | 4/2002 | Kweon et al. |
| 6,420,071 B1 | 7/2002 | Lee et al. |
| 6,428,766 B1 | 8/2002 | Fujino et al. |
| 6,489,060 B1 | 12/2002 | Zhang et al. |

(Continued)

FOREIGN PATENT DOCUMENTS

| | | |
|---|---|---|
| EP | 2264814 A1 | 12/2010 |
| JP | 57065674 A2 | 4/1982 |

(Continued)

OTHER PUBLICATIONS

Machine Translation of: JP 2008/251480, Nagura et al., Oct. 16, 2008.*
Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.
Aurbach et al., "On the capacity fading of LiCoO2 intercalation electrodes: the effect of cycling, storage, temperature, and surface film forming additives," Electrochimica Acta 47 (2002) 4291-4306.

(Continued)

*Primary Examiner* — Kenneth Douyette
(74) *Attorney, Agent, or Firm* — Dardi & Herbert, PLLC; Peter S. Dardi

(57) ABSTRACT

Lithium ion battery positive electrode material are described that comprise an active composition comprising lithium metal oxide coated with an inorganic coating composition wherein the coating composition comprises a metal chloride, metal bromide, metal iodide, or combinations thereof. Desirable performance is observed for these coated materials. In particular, the non-fluoride metal halide coatings are useful for stabilizing lithium rich metal oxides.

23 Claims, 35 Drawing Sheets

(56) References Cited

U.S. PATENT DOCUMENTS

| | | | |
|---|---|---|---|
| 6,589,499 | B2 | 7/2003 | Gao et al. |
| 6,596,435 | B2 | 7/2003 | Kelley et al. |
| 6,660,432 | B2 | 12/2003 | Paulsen et al. |
| 6,677,082 | B2 | 1/2004 | Thackeray et al. |
| 6,680,143 | B2 | 1/2004 | Thackeray et al. |
| 6,749,648 | B1 | 6/2004 | Kumar et al. |
| 6,872,491 | B2 | 3/2005 | Kanai et al. |
| 6,964,828 | B2 | 11/2005 | Lu et al. |
| 7,078,128 | B2 | 7/2006 | Lu et al. |
| 7,135,252 | B2 | 11/2006 | Thackeray et al. |
| 7,205,072 | B2 | 4/2007 | Kang et al. |
| 7,285,357 | B2 | 10/2007 | Jordy et al. |
| 7,364,793 | B2 | 4/2008 | Paulsen et al. |
| 7,368,071 | B2 | 5/2008 | Dahn et al. |
| 7,393,476 | B2 | 7/2008 | Shiozaki et al. |
| 7,416,813 | B2 | 8/2008 | Fujihara et al. |
| 7,435,402 | B2 | 10/2008 | Kang et al. |
| 7,452,631 | B2 | 11/2008 | Kitao et al. |
| 7,468,223 | B2 | 12/2008 | Thackeray et al. |
| 7,517,613 | B2 | 4/2009 | Yuasa et al. |
| 7,674,557 | B2 | 3/2010 | Sun et al. |
| 7,927,506 | B2 | 4/2011 | Park |
| 7,935,270 | B2 | 5/2011 | Park |
| 2002/0055042 | A1 | 5/2002 | Kweon et al. |
| 2002/0114995 | A1 | 8/2002 | Thackeray et al. |
| 2003/0082448 | A1 | 5/2003 | Cho et al. |
| 2003/0087155 | A1 | 5/2003 | Cho et al. |
| 2003/0108790 | A1 | 6/2003 | Manthiram et al. |
| 2004/0076884 | A1 | 4/2004 | Lee et al. |
| 2004/0091779 | A1 | 5/2004 | Kang et al. |
| 2005/0031942 | A1 | 2/2005 | Hennige et al. |
| 2005/0202316 | A1 | 9/2005 | Hwang et al. |
| 2006/0051671 | A1 | 3/2006 | Thackeray et al. |
| 2006/0051673 | A1 | 3/2006 | Johnson et al. |
| 2006/0083991 | A1 | 4/2006 | Ahn et al. |
| 2006/0147809 | A1 | 7/2006 | Amine et al. |
| 2006/0188781 | A1 | 8/2006 | Thackeray et al. |
| 2006/0257743 | A1 | 11/2006 | Kuratomi et al. |
| 2006/0275667 | A1 | 12/2006 | Watanabe et al. |
| 2007/0072080 | A1 | 3/2007 | Inagaki et al. |
| 2007/0111098 | A1 | 5/2007 | Yang Kook et al. |
| 2007/0202405 | A1 | 8/2007 | Shizuka et al. |
| 2007/0292757 | A1 | 12/2007 | Watanabe et al. |
| 2008/0102369 | A1 | 5/2008 | Sakata et al. |
| 2008/0107968 | A1 | 5/2008 | Patoux et al. |
| 2008/0118847 | A1 | 5/2008 | Jung et al. |
| 2008/0135802 | A1 | 6/2008 | Saito et al. |
| 2008/0157027 | A1 | 7/2008 | Manthiram et al. |
| 2008/0193841 | A1 | 8/2008 | Sun et al. |
| 2008/0241693 | A1 | 10/2008 | Fukuchi et al. |
| 2008/0268347 | A1 | 10/2008 | Ohzuku et al. |
| 2009/0087362 | A1 | 4/2009 | Sun et al. |
| 2009/0104532 | A1* | 4/2009 | Hosoya ......................... 429/224 |
| 2009/0155694 | A1 | 6/2009 | Park |
| 2009/0212267 | A1* | 8/2009 | Dobbs et al. ............... 252/521.2 |
| 2009/0253042 | A1 | 10/2009 | Sun et al. |
| 2009/0263707 | A1 | 10/2009 | Buckley et al. |
| 2009/0297947 | A1 | 12/2009 | Deng et al. |
| 2009/0305131 | A1 | 12/2009 | Kumar et al. |
| 2010/0086853 | A1 | 4/2010 | Venkatachalam et al. |
| 2010/0086854 | A1 | 4/2010 | Kumar et al. |
| 2010/0119942 | A1 | 5/2010 | Kumar |
| 2010/0151332 | A1 | 6/2010 | Lopez et al. |
| 2011/0017528 | A1 | 1/2011 | Kumar et al. |
| 2011/0052981 | A1 | 3/2011 | Lopez et al. |
| 2011/0052989 | A1 | 3/2011 | Venkatachalam et al. |
| 2011/0076556 | A1 | 3/2011 | Karthikeyan et al. |
| 2011/0111294 | A1 | 5/2011 | Lopez et al. |
| 2011/0111298 | A1 | 5/2011 | Lopez et al. |
| 2011/0136019 | A1 | 6/2011 | Amiruddin et al. |
| 2011/0236751 | A1 | 9/2011 | Amiruddin et al. |
| 2011/0244331 | A1 | 10/2011 | Karthikeyan et al. |
| 2012/0028105 | A1 | 2/2012 | Kumar et al. |
| 2012/0056590 | A1 | 3/2012 | Amiruddin et al. |

FOREIGN PATENT DOCUMENTS

| | | |
|---|---|---|
| JP | 06-243871 A | 9/1994 |
| JP | 09-045373 | 2/1997 |
| JP | 10-255837 | 9/1998 |
| JP | 3112138 | 9/2000 |
| JP | 3157413 B2 | 4/2001 |
| JP | 3172388 B2 | 6/2001 |
| JP | 2002-110167 | 4/2002 |
| JP | 3506397 | 12/2003 |
| JP | 2006-134816 | 5/2006 |
| JP | 2006-261127 | 9/2006 |
| JP | 2006-344425 | 12/2006 |
| JP | 2007-220630 | 8/2007 |
| JP | 3276451 | 2/2008 |
| JP | 2008-536285 | 9/2008 |
| JP | 2008-251480 | 10/2008 |
| JP | 2008258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 | 1/2008 |
| KR | 10-0822013 B1 | 4/2008 |
| KR | 10-2008-0099132 A | 11/2008 |
| KR | 10-2009-0078128 A | 7/2009 |
| KR | 10-2010-0007236 | 1/2010 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2005/119820 A1 | 12/2005 |
| WO | 2006/025707 A1 | 3/2006 |
| WO | 2006/109930 A1 | 10/2006 |
| WO | 2006/137673 A1 | 12/2006 |
| WO | 2008/086041 A1 | 7/2008 |

OTHER PUBLICATIONS

Chen et al., "Studies of LiCoO2 Coated with Metal Oxides," Electrochemical and Solid State Letters, 6 (11) A221-A224 (2003).

Chen et al., "Effect of a ZrO2 Coating on the Structure and Electrochemistry of LixCoO2 When Cycled to 4.5 V," Electrochemical and Solid-State Letters, 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of the Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO2 Cathode Material with Al2O3 Coating for a Li Ion Cell," Chem. Mater. 2000, 12 (12), 3788-3791.

Choi et al., "Superior Capacity Retention Spinel Oxyfluoride Cathodes for Lithium-Ion Batteries," Electrochemical and Solid-State Letters 9 (5) (2006) A245-A248.

Fey et al., "Enhanced cyclability of LiCoO2 cathodes coated with alumina drived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Fey et al., "Saturated linear dicarboxylic acids as chelating agents for the sol-gel synthesis of LiNi0.8Co0.2O2," Materials Chemistry and Physics 87 (2004) 246-255.

Ho et al., "Application of A-C Techniques to the Study of Lithium Diffusion in Tungsten Trioxide Thin Films," J. Electrochem. Soc., 1980; 127(2):343-350.

Hwang et al. "Influence of Mn content on the morphology and electrochemical performance of LiNi1-x-yCoxMnyO2 cathode materials," J. Mater. Chem., 2003; 13:1962-1968.

(56) References Cited

OTHER PUBLICATIONS

Ito et al., "The relationship between crystal structure and the electrochemical reaction of Li-rich insertion materials (2)" 2010.
Johnson et al. "The significance of the Li2MnO3 component in 'composite' xLi2MnO3 • (1-x)LiMn0.5Ni0.5O2 electrodes," Electrochemistry Communications 6 (2004) 1085-1091.
Kang et al., "Enchancing the rate capability of high capacity xLi2Mn03 • (1-x)LiMO2 (M=Mn, Ni, Co) electrodes by Li—Ni—PO4 treatment," Electrochemistry Communications 11 (2009) 748-751.
Kang et al., "Layered Li(Li0.2Ni0.15=0.5zCo0.10Mn0.55-0.5z)O2-zFz cathode materials for Li-ion secondary batteries," Journal of Power Sources 146 (2005) 654-657.
Kim et al., "Remarkable improvement in cell safety for Li[Ni0.5Co0.2Mn0.3]O2 coated with LiFePO4," Journal of Alloys and Compounds 492 (2010) L87-L90.
Kim et al., "Synthesis of spherical Li[Ni(1/3−z)Co(1/3−z)Mn(1/3−z)Mgz]O2 as positive electrode material for lithium ion battery," Electrochimica Acta 51 (2006) 2447-2453.
Kim et al., "Improvement of High-Voltage Cycling Behavior of Surface-Modified Li[Ni1/3Co1/3Mn1/3]O2 Cathodes by Fluorine Substitution for Li-Ion Batteries," Journal of the Electrochemical Society 152 (9) A1707-A1713 (2005).
Kim et al., "Electrochemical Stability of Thin-Film LiCoO2 Cathodes by Aluminum-Oxide Coating," Chem. Mater. 2003, 15(7):1505-1511.
Lee et al., "High capacity Li[Li0.2Ni0.2Mn0.6]O2 cathode materials via a carbonate co-precipitation method," J. of Power Sources, 162 (2006), 1346-1350.
Lee et al., "Electrochemical characteristics of Al2O3-coated lithium manganese spinel as a cathode material for a lithium secondary battery," J. of Power Sources 126 (2004) 150-155.
Luo et al., "On the incorporation of fluorine into the manganese spinel cathode lattice," Solid State Ionics 180 (2009) 703-707.
Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).
Okumura et al., "Cathode having high rate performance for a secondary Li-ion cell surface-modified by aluminum oxide nanoparticles," J. of Power Sources 189 (2009) 471-475.
Ohsawa et al., "The relationship between crystal structure and the electrochemical reaction of Li-rich insertion materials (1)," 2010.
Ruberto, "Metastable Alumina from Theory: Bulk, Surface, and Growth of κ-Al2O3," Thesis for the Degree of Doctor of Philosophy, Department of Applied Physics, Chalmers University of Technology and Goteborg University, 2001.
Song et al., "Two- and three-electrode impedance spectroscopy of lithium-ion batteries," J. of Power Sources, 2002; 111:255-267.
Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).
Sun et al., "The preparation and electrochemical performance of solid solutions LiCoO2—Li2MnO3 as cathode materials for lithium ion batteries," J of Power Sources 159 (2006) 1353-1359.
Sun et al., "Significant Improvement of high voltage cycling behavior AlF3-coated LiCoO2 cathode," Electrochemistry Communications 8 (2006) 821-826.
Thackeray et al., "Li2MnO3-stabilized LiMO2 (M=Mn, Ni, Co) electrodes for lithium-ion batteries," J. Mater. Chem., 2007; 17:3112-3125.
Thackeray et al., "Comments on the structural complexity of lithium-rich Li1=xM1−xO2 electrodes (M+Mn,Ni,Co) for lithium batteries," Electrochemistry Communications 8 (2006), 1531-1538.
Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1−x)/3Mn(2−x)/3Nix/3Cox/3]O2 Cathodes with Low Irreversible Capacity Loss," Electrochemical and Solid State Letters, 9 (5) A221-A224 (2006).
Yabuuchi et al., "Study of LiMnO3-Li(Co1/3Ni1/3Mn1/3)O2 for High Capacity Positive Electrode Material: II. Redox Reaction at the Positive Electrode/Electrolyte Interface," 2010.
Yoshii et al., "Study of LiMnO3-Li(Co1/3Ni1/3Mn1/3)O2 for High Capacity Positive Electrode Material: I. Change in the Crystal and Electronic Structure upon Li de-intercalation," 2010.
Amiruddin et al., pending U.S. Appl. No. 12/630,992, "Lithium Ion Battery with High Voltage Electrolytes and Additives," filed Dec. 4, 2009.
Lopez et al., pending U.S. Appl. No. 12/616,226, "Coated Positive electrode Materials for Lithium Ion Batteries," filed Nov. 11, 2009.
Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.
Kim et al., "Electrochemical and Structural Properties of xLi2M'O3·(1−x)LiMn0.5Ni0.5O2 Electrodes for Lithium Batteries (M'=Ti, Mn, Zr; 0≤x≤0.3)" Chem. Mater. 2004, 16, 1996-2006.
Park et al., "Lithium—manganese—nickel—oxide electrodes with integrated layered-spinel structures for lithium batteries," Electrochemistry Communications 9 (2007) 262-268.
Thackeray et al., "Advances in manganese-oxide 'composite' electrodes for lithium-ion batteries," J. Mater. Chem., 2005,15, 2257-2267.
Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).
Boulineau et al., "Reinvestigation of Li2MnO3 Structure: Electron Diffraction and High Resolution TEM," Chem. Mater. 2009, 21, 4216-4222.
Hong et al, "Structural evolution of layered Li1.2Ni0.2Mn0.6O2 upon electrochemical cycling in a Li rechargeable battery," J. Mater. Chem., 2010, 20, 10179-10186.
Johnson et al., "Lithium-manganese oxide electrodes with layered-spinel composite structures xLi2MnO3 · (1−x)Li1=yMn2—yO4 (0<x<1, 0≤y≤0.33) for lithium batteries," Electrochemistry Communications 7 (2005) 528-536.
Kang et al., "The Effects of Acid Treatment on the Electrochemical Properties of 0.5 Li2MnO3·0.5 LiNi0.44Co0.25Mn.03lO2 Electrodes in Lithium Cells," Journal of the Electrochemical Society 153(6):A1186-A1192 (2006).
Park et al, "Physical and electrochemical properties of spherical Li1=x(Ni1/3Co1/3Mn1/3)1−xO2 cathode materials", Journal of Power Sources, 177:177-183 (2008).
Robertson et al., "Mechanism of Electrochemical Activity in Li2MnO3," Chem. Mater. 2003, 15, 1984-1992.
Yabuuchi et al., "Detailed Studies of a High-Capacity Electrode Material for Rechargeable Batteries, Li2MnO3—LiCo1/3Ni1/3Mn1/3O2," J. Am. Chem. Soc. 2011, 133, 4404-4419.
Search Report and Written Opinion for International Application No. PCT/US2011/049559, mailed Apr. 23, 2012.
Shin et al, "Improvement of electrochemical properties of Li[Ni0.4Co0.2Mn(0.4−x)]O2-yFy cathode materials at high voltage region", Electrochimica Acta 52 1477-1482 (2006).
Ito et al., "Cyclic deterioration and it's improvement for Li-rich layered cathode material Li [Ni0.17Li0.2Co0,07Mn0.56]O2," Journal of Power Sources, 195: 567-573 (2010).
Ito et al., "A new approach to improve the high-voltage cyclic performance of Li-rich layered cathode material by electrochemical pretreatment," Journal of Power Sources 183: 344-346 (2008).
Sun et al, "Effect of AlF3 coating amount on high voltage cycling performance of LiCoO2," Electrochimica Acta 53:1013-1019 (2007).

* cited by examiner

METAL HALIDE COATINGS ON LITHIUM ION BATTERY POSITIVE ELECTRODE MATERIALS AND CORRESPONDING BATTERIES

FIELD OF THE INVENTION

The invention relates to active material for positive electrodes for a lithium ion battery, in which the active material has a coating comprising a metal chloride, metal bromide, and/or metal iodide. The invention further related to method for forming the coated active material and to lithium ion batteries comprising the active material.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that incorporates lithium when the battery is charged. For some current commercial batteries, the negative electrode material can be graphite, and the positive electrode material can comprise lithium cobalt oxide ($LiCoO_2$). In practice, only a modest fraction of the theoretical capacity of the positive electrode active material generally can be used. At least two other lithium-based positive electrode active materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a lithium ion battery positive electrode material comprising an active composition comprising lithium metal oxide coated with an inorganic coating composition wherein the coating composition comprises a metal chloride, metal bromide, metal iodide, or combinations thereof.

In a further aspect, the invention pertains to a method for making a positive electrode material coated with a metal/metalloid non-fluoride halide, wherein the non-fluoride halide comprises chloride, bromide, iodide or a combination thereof, the method comprising combining in solution an appropriate amount of a soluble metal salt, a soluble non-fluoride halide compound and lithium metal oxide particles to precipitate metal halide as a coating on the metal oxide particles and calcining the coated metal oxide particles in a substantially oxygen free atmosphere at a temperature from about 200° C. to about 800° C. for a time from about 1 h to about 25 h to form the metal/metalloid non-fluoride halide coated lithium metal oxide positive electrode material.

In additional aspects, the invention pertains to a method for making a positive electrode material coated with a metal/metalloid halide in which the method comprises milling a powder of the positive electrode material with a selected amount of a powder of the metal/metalloid halide to coat the positive electrode material with the metal/metalloid halide.

In another aspect, the invention pertains to a lithium ion battery comprising, a positive electrode, a negative electrode comprising a lithium incorporation composition, a separator between the positive electrode and the negative electrode, and an electrolyte comprising lithium ions. The positive electrode generally comprises an active material, distinct electrically conductive powders, and a polymer binder. The positive electrode active material comprises an active composition comprising lithium metal oxide coated with a metal halide coating composition, and the positive electrode active material having an average voltage of at least about 3.65 volts over a discharge from 4.5 to 2 volts at a rate of C/10 and a specific discharge specific capacity of at least about 160 mAh/g at cycle 500 at a discharge rate of C/3 from 4.5 volts to 2 volts.

DETAILED DESCRIPTION OF THE INVENTION

Figure 1:
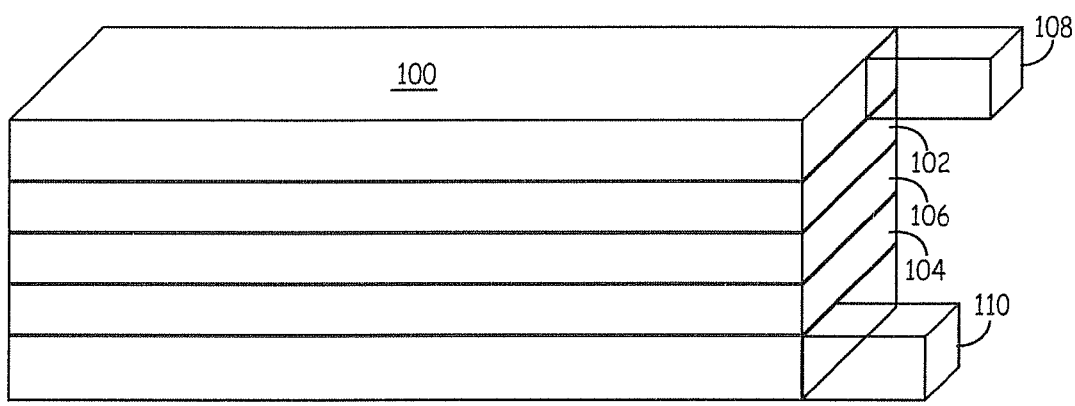
FIG. 1 is a schematic drawing of a battery structure separated from a container.

It has been found that non-fluoride metal halide coatings can provide significant improvement in the performance of positive electrode active materials within lithium-based batteries. Specifically, the non-fluoride halide coated lithium metal oxides described herein pertains to cathode active compositions, such as lithium rich layer-layer compositions, coated with metal iodide, metal bromide, and/or metal chloride to form a nanocoating, which is generally believed to be inert with respect to reduction/oxidation reactions in the batteries. In general, the non-fluoride metal halide coatings can provide desirable improvements in battery performance for a wide range of positive electrode active materials. In some embodiments, the structure of the cathode composition can be, for example, layered-layered, spinel, olivine, layered, and combinations thereof, e.g. layered-spinel structures. The metal halides can comprise mono-, di-, tri-, tetra-, penta- and hexa-valent metal cations along with the corresponding non-fluoride halide anions, i.e., iodide, bromide, and/or chloride. The non-fluoride halide coatings surprisingly can provide in some embodiments essentially comparable performance relative to corresponding fluoride coatings.

The metal halide nanocoating on the lithium ion battery cathode compositions are believed to enhance the electrode-electrolyte interface by preventing or reducing potential unwarranted side reactions, such as side reactions that can lead to transition metal ion dissolution into the electrolyte. Transition metal ion dissolution is thought to potentially result in loss of structural integrity of the cathode, which may lead to capacity fade. Furthermore, a metal iodide, metal bromide, and/or metal chloride nanocoating can result in an increase in specific discharge capacity and a reduction of the first cycle irreversible capacity, which can be exploited to improve the overall energy density of the battery. Consequently, the metal halide coating can enhance electrochemical, thermal, and structural properties of the cathode, i.e., positive electrode. In addition, with respect to corresponding performance of the positive electrode active material, the metal halide coating can enhance the first cycle efficiency, high voltage operation, cycle life, true density, and greater rate capability of the battery.

The batteries described herein are lithium-based batteries in which a non-aqueous electrolyte solution comprises lithium ions. For secondary lithium ion batteries during charge, oxidation takes place at the cathode (positive electrode) where lithium ions are extracted and electrons are released. During discharge, reduction takes place in the cathode where lithium ions are inserted and electrons are consumed. Generally, the batteries are formed with lithium ions in the positive electrode material such that an initial charge of the battery transfers a significant fraction of the lithium from the positive electrode material to the negative electrode material to prepare the battery for discharge. Unless indicated otherwise, performance values referenced herein are at room temperature.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic. The term "pristine" is used herein interchangeably with the term uncoated to refer to a positive electrode active composition that is not coated with metal halides.

In some embodiments, the lithium ion batteries can use a positive electrode active material that is lithium rich relative to a reference homogenous electroactive lithium metal oxide composition. The excess lithium can be referenced relative to a composition $LiMO_2$, where M is one or more metals with an average oxidation state of +3. The additional lithium in the initial cathode material can provide corresponding greater amounts of cycling lithium that can be transferred to the negative electrode during charging to increase the battery capacity for a given weight of cathode active material. In some embodiments, the additional lithium is accessed at higher voltages such that the initial charge takes place at a higher voltage to access the additional capacity represented by the additional lithium of the positive electrode.

Lithium rich positive electrode active compositions of particular interest can be approximately represented in a single component notation with a formula $Li_{1+b}Ni_\alpha Mn_\beta Co_\gamma A_\delta O_{2-z}F_z$, where b ranges from about 0.05 to about 0.3, $\alpha$ ranges from about 0.1 to about 0.4, $\beta$ range from about 0.2 to about 0.65, $\gamma$ ranges from about 0 to about 0.46, $\delta$ ranges from about 0 to about 0.15, and z ranges from 0 to about 0.2, and where A is Mg, Sr, Ba, Cd, Zn, Al, Ga, B, Zr, Ti, Ca, Ce, Y, Nb, Cr, Fe, V, Li or combinations thereof. Furthermore, emerging cathode active compositions of potentially great commercial significance are lithium rich as well as a layered-layered multiphase structure in a highly crystalline composition, in which the additional lithium supports the formation of an alternative crystalline phase. It has been observed that the layered-layered lithium rich active materials can undergo significant irreversible changes during the first charge of the battery, but these lithium rich compositions can still exhibit surprisingly large specific discharge capacity on cycling. Also, the cycling can be stabilized, such as with the coatings described herein, such that the high specific capacity can be exploited for a significant number of cycles.

With respect to the lithium rich materials with a layered-layered composite structure, the positive electrode material can be represented in two component notation as $xLi_2M'O_3 \cdot (1-x)LiMO_2$ where M is one or more metal cations with an average valance of +3 with at least one cation being a Mn ion or a Ni ion, such as a combination of Mn, Co, and Ni, and where M' is one or more metal cations with an average valance of +4. In some embodiments, a $Li_2MnO_3$ material may be structurally integrated with either the layered $LiMO_2$ component. These compositions generally are described further generally, for example, in U.S. Pat. No. 6,680,143 to Thackeray et al., entitled "Lithium Metal Oxide Electrodes for Lithium Cells and Batteries," incorporated herein by reference.

Surprisingly large capacities have been obtained for $Li[Li_{0.2}Ni_{0.175}Co_{0.10}Mn_{0.525}]O_2$, as presented in U.S. patent application Ser. No. 12/332,735, now U.S. Pat. No. 8,465,873, to Lopez et al. (the '735 application) entitled "Positive Electrode Material for High Specific Discharge Capacity Lithium Ion Batteries", incorporated herein by reference. The materials in the '735 application were synthesized using a carbonate co-precipitation process. Also, very high specific capacities were obtained for this composition using hydroxide co-precipitation and sol gel synthesis approaches as described in U.S. application Ser. No. 12/246,814, now U.S. Pat. No. 8,389,160, to Venkatachalam et al. (the '814 application) entitled "Positive Electrode Material for Lithium Ion Batteries Having a High Specific Discharge Capacity and Processes for the Synthesis of these Materials", incorporated herein by reference. In addition to the high specific capacity, the active compositions can exhibit a relatively large tap density which leads to high overall capacity of the material in fixed volume applications.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss (IRCL) is the difference between the charge capacity of the new battery and the first discharge capacity. The irreversible capacity loss results in a corresponding decrease in the capacity, energy and power for the cell. The irreversible capacity lose generally can be attributed to changes during the initial charge-discharge cycle of the battery materials that are substantially maintained during subsequent cycling of the battery. Some of these irreversible capacity losses can be attributed to the positive electrode active materials, and the coated materials described herein can result in a decrease in the irreversible capacity loss of the batteries.

For some of the lithium rich compositions, uncoated cathode compositions can have exceptionally high capacity, e.g. >250 mAh/g during the initial cycles, when cycled to a high voltage cut-off of 4.5 or 4.6 volts. During the first activation cycle, the evolution of oxygen can be a significant reason for a higher IRCL in these type of excess Li containing cathodes, in which the oxygen is generated from the reaction $Li_2MnO_3 \rightarrow MnO_2 + 2Li^+ + 2e^- + \frac{1}{2}O_2$. Also, significant capacity fade can be seen occurring over extended periods of cycling especially at higher currents or discharge rates. A potential contribution to the capacity fade is a higher charge cut-off voltage, which might trigger the possible non-lithium metal ion dissolution, especially Mn, from the positive electrode. The Mn dissolution may occurs through a disproportionation reaction of $Mn^{3+}: 2Mn^{3+} \rightarrow Mn^{2+} + Mn^{4+}$, where the $Mn^{2+}$ is believed to migrate to the electrolyte and to the anode, i.e., negative electrode resulting in a capacity fade. The disproportionation reaction of $Mn^{+3}$ may occur spontaneously with greater frequency at higher temperatures and at greater charge/discharge rates. The metal halide coating may also decrease irreversible changes to the lithium metal oxide active materials that can also contribute to capacity fade with cycling as well as the first cycle irreversible capacity loss. By incorporating a metal halide coating on the surface of the high capacity cathode particles, the cycle life of the high capacity cathode based lithium ion cell battery can be improved. While not wanting to be limited by theory, the coatings may stabilize the crystal lattice of the positive electrode active material during the uptake and release of lithium ions so that irreversible changes in the crystal lattice are reduced significantly.

Some materials have been previously studied as stabilizing coatings for positive electrode active materials in lithium ion batteries. For example, the general use of metal fluoride compositions as coatings for cathode active materials, specifically $LiCoO_2$, and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. In the case of $LiN_{1/3}Co_{1/3}Mn_{1/3}O_2$ (L333) and other mixed metal oxides, $AlF_3$ has been studied by Y. K. Sun et al., from Hanyang University, South Korea, as described in articles Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154(3), A168-173 (January 2007) and Woo et al., "Significant Improvement of Electrochemical Performance of $AlF_3$-Coated $Li[Ni_{0.8}Co_{0.1}Mn_{0.1}]O_2$ Cathode Materials, "J. of the Electrochemical Society, 154(11), A1005-1009 (September 2007), both of which are incorporated herein by reference.

It has been found that metal/metalloid fluoride coatings can significantly improve the performance of lithium rich layered compositions for lithium ion secondary batteries. See, for example, the '735 application and the '814 application, above. It has been discovered that thin metal fluoride coatings provide particularly improved performance with performance for many battery parameters of interest peaking at a relatively thin coating thickness of less than 10 nanometers. Improved metal fluoride coatings with appropriately engineered thicknesses are described in copending U.S. patent application Ser. No. 12/616,226 to Lopez et al, (the '226 application) entitled "Coated Positive Electrode Materials for Lithium Ion Batteries," incorporated herein by reference.

There are various reports on partially doping halides for oxygen in the case of spinel $LiMn_2O_4$ mainly to suppress the Jahn-Teller distortion which leads to a capacity fading during cycling. See, for example, U.S. Pat. No. 6,872,491 to Kanai et al., entitled "Positive Electrode Active Material and Lithium Secondary Battery," and published PCT application WO 99/60638 to Sunstrum et al., entitled "Battery Cathode Materials," both of which are incorporated herein by reference. A complex coating comprising a mixture of aluminum cations with phosphate anions and halogen anions in a structure referred to as a multinary oxide coating is described in published U.S. patent application 2006/0083991 to Ahn et al., entitled "Electrode Active Material with Multi-Element Based Oxide Layers and Preparation Method Thereof," incorporated herein by reference.

Various other coatings such as $Al_2O_3$, $AlPO_4$, $ZrO2$, and $Bi_2O_3$, etc. to improve the material properties which in turn improves the electrochemical performance have been reported for both layered lithiated oxides and spinel cathodes. See, for example, copending U.S. patent application Ser. No. 12/870,096 to Karthikeyan et al. entitled "Metal Oxide Coated Positive Electrode Materials for Lithium-Based Batteries", incorporated herein by reference. Metal oxide coatings were effective to improve performance properties for lithium rich metal oxide positive electrode active materials.

Appropriate non-fluoride metal halide coating materials can both improve the long term cycling performance of the material as well as decrease the first cycle irreversible capacity loss. A range of suitable metal cations for the coating materials are described in detail below, and aluminum can be desirable due to cost and low environmental impact. As used herein, the non-fluoride halide coatings comprise a majority of non-fluoride halide anions and are approximately free of phosphate anions. Also, the halide coatings are annealed in an oxygen free environment and are approximately oxygen free. For aluminum fluoride coatings, evidence suggests that the coating stabilizes the underlying oxides through the suppression of oxygen loss form the active material, as described in Myung et al., "Effects of $AlF_3$ Coating on Thermal Behavior of Chemically Delithiated $Li_{0.35}[Ni_{1/3}Co_{1/3}Mn_{1/3}]O_2$," J. Phys. Chem. C, February 2010, Vol. 114, 4710-4718. In some embodiments, the non-fluoride metal halide coating composition can be mixed with metal/metalloid fluoride to be used as a mixed metal halide coating.

With non-fluoride metal halides, the anion has a much larger ionic diameter relative to oxygen anions in the lattice of the underlying lithium metal oxide active material. On the other hand, fluoride anions have an ionic radius similar to oxygen anions. According to the CRC Handbook of Chemistry and Physics, 76th Edition (1995-1996) the relevant ionic radii in crystals are as follows: $F^-$ 1.33 Å, $O^{-2}$ 1.36 Å (coordination number 3) or 1.40 Å (coordination number 6), $Cl^-$ 1.81 Å, $Br^-$ 1.96 Å and $I^-$ 2.20 Å. Thus, fluorine has been used as a dopant to replace a portion of the oxygen anions, and metal fluorides have been used as coatings presumably based on the compatibility of the metal fluorides with the underlying highly crystalline metal oxide active material. Based on the large difference in ionic radii of the non-fluoride anions, it is surprising that the non-fluoride metal halide coating compositions are effective as coating compositions.

Non-fluoride, metal halide (chloride, bromide, and iodide) coatings have been surprisingly found to provide significant stabilization for positive electrode active materials for lithium ion batteries. Specifically, the coating can stabilize cycling of the materials and increase the specific discharge capacity of the material as well as providing a decrease in first cycle irreversible capacity loss. The coating based on metal chlorides, metal bromides, metal iodides, or combinations thereof surprisingly result in comparable stabilization relative to corresponding fluoride coatings, which have been studied previously for some positive electrode active materials.

As described herein, a method for the formation of a coated lithium metal oxide material with a non-fluoride metal halide coating comprise a solution phase deposition step and a heating step directed to the dried powder obtained from the deposition step. Specifically, the method comprises precipitating of a metal halide in the presence of powders of the active metal oxide material. Then, after the initially coated powder is collected and dried, the non-fluoride metal halide coated lithium metal oxide composition is annealed at a temperature of at least about 250° C. in a substantially oxygen free environment.

It has been found that metal halide coatings provide a specific capacity improvement at low amounts of coating material. The metal halide coatings can provide improvements in specific capacity of the cathode active compositions even at relatively high rates. In general, the specific capacity of the active material in a positive electrode increases significantly with a coating that is applied at a relatively low amount. In general, the performance of the material in the positive electrode with respect to specific capacity is better if there is less than about 1 mole percent metal halide coating. The coatings have also been found useful for improving the cycling performance and reducing fade with cycling.

It is useful to note that during charge/discharge measurements, the specific capacity of a material depends on the rate of discharge. The greatest specific capacity of a particular material is measured at very slow discharge rates. In actual use, the actual specific capacity is less than the maximum value due to discharge at a faster rate. More realistic specific capacities can be measured using reasonable rates of discharge that are more similar to the rates encountered during actual use. For example, in low to moderate rate applications, a reasonable testing rate involves a discharge of the battery over three hours. In conventional notation this is written as C/3 or 0.33 C. Faster or slower discharge rates can be used as desired, and the rates can be described with the same notation.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. The batteries described herein that incorporate desirable positive electrode active materials with respect to specific capacity, tap density, and cycling can provide improved performance for consumers, especially for medium current applications. In particular, the batteries described herein are suitable for vehicle applications, such as in battery packs for hybrid vehicles, plug-in hybrid vehicles and purely electric vehicles. These vehicles generally have a battery pack that is selected to balance weight, volume and capacity. While larger battery packs can provide a greater range on electric operation, larger packs take up more room that is then not available for other purposes and have greater weight that can decrease performance. Thus, due to the high capacity of the batteries described herein, a battery pack that yields a desired amount of total power can be made in a reasonable volume, and these battery packs can correspondingly achieve the excellent cycling performance described herein.

Lithium Metal Oxide Active Compositions

In general, the lithium ion battery positive electrode materials can be any reasonable positive electrode active material, such as stoichiometric layered cathode materials with hexagonal lattice settings like $LiCoO_2$, $LiNiO_2$, $LiMnO_2$, or the like; cubic spinel cathode materials such as $LiMn_2O_4$, $Li_4Mn_5O_{12}$, or the like; olivine $LiMPO_4$ (M=Fe, Co, Mn, combinations thereof and the like) type materials; layered cathode materials such as $Li_{1+x}(NiCoMn)_{0.33-x}O_2$ ($0 \leq x < 0.3$) systems; layer-layer composites, such as $xLi_2MnO_3 \cdot (1-x)LiMO_2$ where M can be Ni, Co, Mn, combinations thereof and the like; and composite structures like layered-spinel structures such as $LiMn_2O_4 \cdot LiMO_2$. In some embodiments, a lithium rich composition can be referenced relative to a composition $LiMO_2$, where M is one or more metals with an average oxidation state of +3. Generally, the lithium rich compositions can be represented approximately with a formula $Li_{1+x}M_{1-y}O_2$, where M represents one or more non-lithium metals and y is related to x based on the average valance of the metals. In the layer-layer composite compositions, x is approximately equal to y. The additional lithium in the initial cathode material can provide to some degree corresponding additional active lithium for cycling that can increase the battery capacity for a given weight of cathode active material. In some embodiments, the additional lithium is accessed at higher voltages such that the initial charge takes place at a higher voltage to access the additional capacity.

Lithium rich positive electrode active materials of particular interest represented approximately by a formula $Li_{1+b}Ni_{\alpha}Mn_{\beta}Co_{\gamma}A_{\delta}O_{2-z}F_z$, where b ranges from about 0.05 to about 0.3, α ranges from about 0 to about 0.4, β range from about 0.2 to about 0.65, δ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof. To simplify the following discussion in this section, the optional fluorine dopant is not discussed further. Desirable lithium rich compositions with a fluorine dopant are described further in copending U.S. patent application Ser. No. 12/569,606 to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in copending U.S. patent application Ser. No. 12/870,295 to Venkatachalam et al., entitled Lithium Doped Cathode Material," incorporated herein by reference. The specific performance properties obtained with +2 metal cation dopants, such as $Mg^{+2}$, are described in copending U.S. patent application Ser. No. 12/753,312 to Karthikeyan et al., entitled "Doped Positive Electrode Active Materials and Lithium Ion Secondary Batteries Constructed Therefrom," incorporated herein by reference. A person of ordinary skill in the art will recognize that additional ranges of parameter values within the explicit compositional ranges above contemplated and are within the present disclosure.

If $b+\alpha+\beta+\gamma+\delta$ is approximately equal to 1, the positive electrode material with the formula above can be represented approximately in two component notation as $x\,Li_2M'O_3 \cdot (1-x)LiMO_2$ where $0<x<1$, M is one or more metal cations with an average valance of +3 with at least one cation being a Mn ion or a Ni ion and where M' is one or more metal cations with an average valance of +4. It is believed that the layer-layer composite crystal structure has a structure with the excess lithium supporting the formation of an alternative crystalline phase. For example, in some embodiments of lithium rich materials, a $Li_2MnO_3$ material may be structurally integrated with either a layered $LiMO_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," incorporated herein by reference.

Recently, it has been found that the performance properties of the positive electrode active materials can be engineered around the specific design of the composition stoichiometry. The positive electrode active materials of particular interest can be represented approximately in two component notation as $x\,Li_2MnO_3 \cdot (1-x)\,LiMO_2$, where M is one or more metal elements with an average valance of +3 and with one of the metal elements being Mn and with another metal element being Ni and/or Co. In general, $0<x<1$, but in some embodiments $0.03 \leq x \leq 0.55$, in further embodiments $0.075 \leq x \leq 0.50$, in additional embodiments $0.1 \leq x \leq 0.45$, and in other embodiments $0.15 \leq x \leq 0.425$. A person of ordinary skill in the art will recognize that additional ranges within the explicit ranges of parameter x above are contemplated and are within the present disclosure. For example, M can be a combination of nickel, cobalt and manganese, which, for example, can be in oxidation states $Ni^{+2}$, $Co^{+3}$, and $Mn^{+4}$ within the initial lithium manganese oxides. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich.

In general, M can be written as $Ni_uMn_vCo_wA_y$. For embodiments in which y=0, this simplifies to $Ni_uMn_vCo_w$. If M includes Ni, Co, Mn, and optionally A the composition can be written alternatively in two component notation and single component notation as the following.

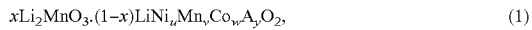

$x Li_2MnO_3 \cdot (1-x) LiNi_uMn_vCo_wA_yO_2$, (1)

$Li_{1+b}Ni_\alpha Mn_\beta Co_\gamma A_\delta O_2$, (2)

with $u+v+w+y \approx 1$ and $b+\alpha+\beta+\gamma+\delta \approx 1$. The reconciliation of these two formulas leads to the following relationships:

$b=x/(2+x)$, $\alpha=2u(1-x)/(2+x)$, $\beta=2x/(2+x)+2v(1-x)/(2+x)$, $\gamma=2w(1-x)/(2+x)$, $\delta=2y(1-x)/(2+x)$, and similarly, $x=2b/(1-b)$, $u=\alpha/(1-3b)$, $v=(\beta-2b)/(1-3b)$, $w=\gamma/(1-3b)$, $y=\delta/(1-3b)$.

In some embodiments, it may be desirable to have $u \approx v$, such that Li $Ni_uMn_vCo_wA_yO_2$ becomes approximately Li $Ni_uMn_uCo_wA_yO_2$. In this composition, when y=0, the average valance of Ni, Co and Mn is +3, and if $u \approx v$, then these elements can have valances of approximately $Ni^{+2}$, $Co^{+3}$ and $Mn^{+4}$ to achieve the average valance. When the lithium is hypothetically fully extracted, all of the elements go to a +4 valance. A balance of Ni and Mn can provide for Mn to remain in a +4 valance as the material is cycled in the battery. This balance avoids the formation of $Mn^{+3}$, which has been associated with dissolution of Mn into the electrolyte and a corresponding loss of capacity.

In further embodiments, the composition can be varied around the formula above such that Li $Ni_{u+\Delta}Mn_{u-\Delta}Co_wA_yO_2$, where the absolute value of $\Delta$ generally is no more than about 0.3 (i.e., $-0.3 \le \Delta \le 0.3$), in additional embodiments no more than about 0.2 ($-0.2 \le \Delta \le 0.2$) in some embodiments no more than about 0.175 ($-0.175 \le \Delta \le 0.175$) and in further embodiments no more than about 0.15 ($-0.15 \le \Delta \le 0.15$). Desirable ranges for x are given above. With $2u+w+y \approx 0.1$, desirable ranges of parameters are in some embodiments $0 \le w \le 1$, $0 \le u \le 0.5$, $0 \le y \le 0.1$ (with the proviso that both $u+\Delta$ and w are not zero), in further embodiments, $0.1 \le w \le 0.6$, $0.1 \le u \le 0.45$, $0 \le y \le 0.075$, and in additional embodiments $0.2 \le w \le 0.5$, $0.2 \le u \le 0.4$, $0 \le y \le 0.05$. A person of ordinary skill in the art will recognize that additional ranges of composition parameters within the explicit ranges above are contemplated and are within the present disclosure. As used herein, the notation (value1 $\le$ variable $\le$ value2) implicitly assumes that value 1 and value 2 are approximate quantities. The engineering of the composition to obtain desired battery performance properties is described further in copending U.S. patent application Ser. No. 12/869,976, now U.S. Pat. No. 8,394,534, to Lopez, entitled "Layer-Layer Lithium Rich Complex Metal Oxides With High Specific Capacity and Excellent Cycling," incorporated herein by reference.

With respect to compositions approximately represented by the formula x $Li_2MnO_3 \cdot (1-x)$ $LIMO_2$, it is believed that during the initial charging step in which lithium ions are released from the positive electrode, at least some of the $Li_2MnO_3$ reacts to give off molecular oxygen, $O_2$ along with the formation of $MnO_2$. The generation of oxygen is reflected in the irreversible capacity loss since $MnO_2$ can only accept a single lithium ion during discharge of the battery while $Li_2MnO_3$ releases two lithium ions during the initial charge. The halide coatings can reduce the irreversible capacity loss and increase the cycling specific discharge capacity. It is believed that the coating may stabilize the crystal structure. However, evidence suggests that structural and compositions changes can be more complex.

A co-precipitation process has been performed for the desired lithium rich metal oxide materials described herein having nickel, cobalt, manganese and additional optional metal cations in the composition and exhibiting the high specific capacity performance. In addition to the high specific capacity, the materials can exhibit a good tap density which leads to high overall capacity of the material in fixed volume applications. Specifically, lithium rich metal oxide compositions formed by the co-precipitation process were used in coated forms to generate the results in the Examples below. Additionally, a solution assisted precipitation method discussed in detail below can be used to coat the material with metal halide.

Specifically, the synthesis methods based on co-precipitation have been adapted for the synthesis of compositions with the formula $Li_{1+b}Ni_\alpha Mn_\beta Co_\gamma A_\delta O_{2-z}F_z$, as described above. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in the '814 application referenced above. Further details of the carbonate co-precipitation process are described in the '735 application referenced above.

Coating Compositions and Synthesis of Coatings

As demonstrated by the results in the Examples, the non-fluoride metal halide coatings can provide desirable performance improvements relative to the uncoated active compositions. Performance of lithium ion batteries is significantly based on the reduced changes of structure and composition during the lithium topotactic process. To reduce unwanted side reactions during the first charge and during subsequent cycling, modification of the electrolyte and/or structural modification of the cathode materials, such as doping and/or surface modification of the cathode materials, can be employed. Of the potential techniques employed to reduce undesired structure modifications of the cathode active materials, surface modification via a nano-coating is believed to be very productive because of the improved electrode-electrolyte interface. The electrode-electrolyte interface is one of the most challenging areas of solid state electrochemistry as important aspects of the charge-transfer process is largely determined by the property or nature of this subtle interface. Providing more facile diffusion for Li and preventing any irreversible dissolution of cathode active metal ions into electrolyte are believed to be effective means to improve the property of the electrode-electrolyte interface. The non-fluoride halide coatings can be deposited using a two step process with a solution based deposition and a calcining step to anneal the coating.

The loss of non-lithium metal ions from the active material has been implicated with respect to the potential shortening of cycle and shelf life of a battery depending on the chemistry of the cathode. For example, the pristine or undoped $LiMn_3O_4$ based spinel cathode materials are prone for Mn dissolution even during storage because of the presence of 50% $Mn^{3+}$ which is believed to be resulting in dissolution. Layered cathode materials, such as $LiCoO_2$, show dissolution of Co ions depending upon the charge voltage. In the case of $LiNiO_2$, there are various hexagonal to orthorhombic phase transitions at different Li intercalation and de-intercalation which can lead to enormous capacity fade. Suppressing the irreversible changes to the material can result in a lithium ion battery with longer life.

The non-fluoride metal/metalloid halide surface nanocoating materials used can be mono(non-fluoride) halide, i.e., chloride, bromide, iodide, or combinations thereof, of Li, Na, or other monovalent metal cations, or combinations thereof, di-(non-fluoride)halides of Mg, Zn, Ba, Sr, Ca, or other divalent metal cations, or combinations thereof, tri-(non-fluoride) halides of Al, Ga, In, or other trivalent metal cations, or combinations thereof, tetra-(non-fluoride)halides of Zr, Ti, V, or other tetravalent metal cations, or combinations thereof, penta-(non-fluoride)halides of Ta, Nb, or other pentavalent metal cations, or combinations thereof, hexa-(non-fluoride) halides of Mo, W, Ru, or other hexa-valent metal cations, or combinations thereof, and any combinations thereof e.g. mixed metal halide coatings such as $Al_{1-b}Mg_bX_{3-b}$ (X=Cl, Br, or I), or the like.

The non-fluoride metal halide coatings are aimed at addressing the suppression of first cycle IRCL and cycling stability to improve the overall battery performance of the positive electrode material. A stable coating is believed to suppress and limit IRCL over the $1^{st}$ cycle, while suppressing the Mn and other transition metal dissolution occurring over the period of cycling. It has been discovered that stabilization coatings for positive electrode active materials with intermediate thicknesses provide improved results, and this result is also clearly found for the metal halide coatings as discussed in the examples. Furthermore, the various performance values do not necessarily have the same dependence on the stabilization coating amounts such that a balance of parameters can be used to select a desired coating amounts.

The amount of coating material can be a significant aspect that influences both the structural integrity as well as the electrochemical performance of the cathode material. In some embodiments, desirable stabilization coating amounts for non-fluoride metal halides generally are from about 0.025 to about 5 mole percent, in further embodiments from about 0.05 to about 2.5 mole percent, in other embodiments from about 0.075 to about 2 mole percent and in further embodiments from about 0.1 to about 1.5 mole percent. The particular value can be selected to provide a balance of performance improvements such that the resulting batteries have desirable properties. A person of ordinary skill in the art will recognize that additional ranges of coating amounts within the explicit ranges above are contemplated and are within the present disclosure.

In general, the metal halide coatings can be applied using any suitable technique. For example, a mechanical coating of the desired metal halide nanocoating can also happen through a mechanical smearing of the nanocoating over the positive electrode active particles, such as through milling of the materials. In a process of particular interest, the formation of the coating can comprise two steps in which the first step involves precipitation of the coating material and the second step comprises annealing of the coating material. For the deposition step, a wet-chemical process with a soluble metal salt of the metal ion or mixed metal ions and the respective ammonium halide can be employed to surface coat the positive electrode active material through precipitation of the coating material.

With respect to a solution based precipitation step, a powder of the positive electrode material can be mixed in a suitable solvent, such as an aqueous solvent, e.g., purified water. A soluble composition of the desired metal ions can be dissolved in the solvent. The amount of metal ions can be stoichiometric for the desired amount of coating material. Then, ammonium halide solution or other suitable solution of a soluble halide composition can be gradually added to the dispersion/solution to precipitate the metal halide as a coating on the particles of positive electrode material. The total amount of coating reactants can be selected to form the desired amount of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process.

After removing the coated electroactive material from the solution, the material can be washed and dried. The dried material can be heated to complete the formation of the coated material and to improve the quality of the coating. The heating can be performed under a nitrogen atmosphere or other substantially oxygen free atmosphere. In general, the heating to anneal the coating can be performed at a temperature of at least about 250° C., in some embodiments from about 275° C. to about 750° C., and in some embodiments from about 300° C. to about 600° C. The anneal process can be performed for at least about 15 minutes, in some embodiments from about 30 minutes to about 48 hours and in further embodiments from about an hour to about 12 hours. A person of ordinary skill in the art will recognize that additional ranges of temperatures and times within these explicit ranges are contemplated and are within the present disclosure. Specific procedures for the formation of $AlCl_3$, $AlBr_3$, and $AlI_3$ coatings are described in the examples below.

Lithium Ion Batteries

The lithium ion batteries generally comprise a positive electrode, a negative electrode, a separator between the negative electrode and the positive electrode and an electrolyte comprising lithium ions. The electrodes are generally associated with metal current collectors, such as metal foils. Lithium ion batteries refer to batteries in which the negative electrode active material is a material that takes up lithium during charging and releases lithium during discharging. Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into the structure through intercalation, alloying or similar mechanisms. Desirable mixed metal oxides are described further herein to function as electroactive materials for positive electrodes in secondary lithium ion batteries. Lithium ion batteries refer to batteries in which the negative electrode active material is a material that takes up lithium during charging and releases lithium during discharging. If lithium metal itself is used as the anode, the resulting battery generally is referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, other graphitic carbons, niobium pentoxide, tin alloys, silicon, titanium oxide, tin oxide, and lithium titanium oxide, such as $Li_xTiO_2$, $0.5 \leq x \leq 1$ or $Li_{1+x}Ti_{2-x}O_4$, $0 \leq x \leq 1/3$. Additional negative electrode materials are described in published U.S. patent applications 2010/0119942 to Kumar, entitled "Composite Compositions, Negative Electrodes with Composite Compositions and Corresponding Batteries," and 2009/0305131 to Kumar et al., entitled "High Energy Lithium Ion Batteries with Particular Negative Electrode Compositions," both of which are incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidene fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure. In some embodiments, the batteries can be constructed based on the method described in published U.S. patent application 2009/0263707 to Buckley et al, entitled "High Energy Lithium Ion Secondary Batteries", incorporated herein by reference.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders and polymer binders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof. Traditionally, the electrolyte comprises a 1M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent application Ser. No. 12/630,992 filed on Dec. 4, 2009 to Amiruddin et al., entitled "Lithium Ion Battery With High Voltage Electrolytes and Additives," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be placed into a cylindrical or prismatic configuration to form the battery structure. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

Battery Performance

Batteries formed from the coated positive electrode active materials described herein have demonstrated desirable performance under realistic discharge conditions. Specifically, the active materials have demonstrated a high specific capacity upon cycling of the batteries at moderate discharge rates. It has been found that active compositions with a lesser amount of coating material provides desirable performance with respect to several parameters relative to batteries formed with positive electrode active materials with larger amounts of coating material, although irreversible capacity loss generally continues to decrease with an increasing coating thickness over relevant ranges.

As noted above, the irreversible capacity loss is the difference between the first charge specific capacity and the first discharge specific capacity. With respect to the values described herein, the irreversible capacity loss is in the context of the positive electrode active materials, which is evaluated relative to a lithium metal negative electrode. In some embodiments, the irreversible capacity loss is no more than about 50 mAh/g, in further embodiments no more than about 47.5 mAh/g, and in other embodiments from about 30 mAh/g to about 45 mAh/g. A person of ordinary skill in the art will recognize that additional ranges of irreversible capacity loss are contemplated and are within the present disclosure.

Average voltage may be an important parameter for batteries for certain applications. The average voltage can relate to the available capacity above a certain voltage. Therefore, in addition to having a high specific capacity it is desirable for a positive electrode active material to also cycle with a high average voltage. For the materials described herein that are cycled between 4.6V and 2.0V, an average voltage can be at least about 3.5V, in further embodiments at least about 3.525V, in additional embodiments from about 3.54V to about 3.8V and in other embodiments from about 3.55V to about 3.79V. A person of ordinary skill in the art will recognize that additional ranges of average voltage within the explicit ranges above are contemplates and are within the present disclosure.

In general, various similar testing procedures can be used to evaluate the capacity performance of the battery positive electrode materials. Some specific testing procedures are described for the evaluation of the performance values described herein. Suitable testing procedures are described in more detail in the examples below. Specifically, the battery can be cycled between 4.6 volts and 2.0 volts at room temperature, although other ranges can be used with correspondingly different results. Also, the specific capacity is very dependent on the discharge rate. Again, the notation C/x implies that the battery is discharged at a rate to fully discharge the battery to the selected voltage minimum in x hours.

In some embodiments, the positive electrode active material has a specific capacity during the seventh cycle at a discharge rate of C/3 of at least about 245 milliamp hours per gram (mAh/g), in additional embodiments at least about 250 mAh/g, and in further embodiments from about 255 mAh/g to about 265 mAh/g. Additionally, the $50^{th}$ cycle discharge capacity of the material is at least about 94%, and in further embodiments at least about 95% of the $7^{th}$ cycle discharge capacity, cycled at a discharge rate of C/3. Also, the coated materials can exhibit surprisingly good rate capability. Specifically, the materials can have a specific discharge of at least about 165 mAh/g, and in further embodiments at least about 170 mAh/g at a rate of 2 C discharged from 4.6V to 2.0V at room temperature at the 15th charge/discharge cycle. A person of ordinary skill in the art will recognize that additional ranges of specific capacity are contemplated and are within the present disclosure.

In general, the results herein suggest a balance of factors that result in particularly desirable battery performance for a thin coating over the active material for the positive electrode. The results in the example suggest that thicker coatings may result in a greater impedance that may contribute to the capacity and voltage performances observed. With an appropriate coating, excellent specific capacities, cycling and average voltages can be obtained.

EXAMPLES

The following examples demonstrate the effectiveness of non-fluoride metal halide (chloride, bromide, and iodide) coatings to stabilize lithium rich metal oxides in lithium ion batteries. For comparison, corresponding results are also obtained with pristine, i.e., uncoated, lithium metal oxides and with aluminum fluoride coated lithium metal oxides.

The coin cell batteries tested in the Examples were produced following a procedure outlined here. For the formation of the positive electrode, the lithium metal oxide (LMO) powders were mixed thoroughly with acetylene black (Super P™ from Timcal, Ltd, Switzerland) and graphite (KS 6™ from Timcal, Ltd) to form a homogeneous powder mixture. Separately, polyvinylidene fluoride PVDF (KF1300™ from Kureha Corp., Japan) was mixed with N-methyl-pyrrolidone NMP (Honeywell—Riedel-de-Haen) and stirred overnight to form a PVDF-NMP solution. The homogeneous powder mixture was then added to the PVDF-NMP solution and mixed for about 2 hours to form an homogeneous slurry. The slurry was applied onto an aluminum foil current collector to form a thin wet film.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. The mixture comprised at least about 75 weight percent active metal oxide, at least about 3 weight percent acetylene black, at least about 1 weight percent graphite, and at least about 2 weight percent polymer binder.

The positive electrode was placed inside an argon filled glove box for the fabrication of the coin cell batteries. Lithium foil (FMC Lithium) having thickness of 125-150 micron was used as a negative electrode. The electrolyte was selected to be stable at high voltages, and appropriate electrolytes are described in copending U.S. patent application Ser. No. 12/630,992 to Amiruddin et al., entitled "Lithium Ion Battery With High Voltage Electrolytes and Additives," incorporated herein by reference. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

Example 1

Synthesis of a First Cathode Active Material

This example demonstrates the formation of a desired positive electrode active material using a carbonate or hydroxide co-precipitation process. Stoichiometric amounts of metal precursors were dissolved in distilled water to form an aqueous solution with the metal salts in the desired molar ratios. Separately, an aqueous solution containing $Na_2CO_3$ and/or $NH_4OH$ was prepared. For the formation of the samples, one or both solutions were gradually added to a reaction vessel to form metal carbonate or hydroxide precipitates. The reaction mixture was stirred, and the temperature of the reaction mixture was kept between room temperature and 80° C. The pH of the reaction mixture was in the range from 6-12. In general, the aqueous transition metal solution had a concentration from 1M to 3M, and the aqueous $Na_2CO_3/NH_4OH$ solution had a $Na_2CO_3$ concentration of 1M to 4M and/or a $NH_4OH$ concentration of 0.2-2M. The metal carbonate or hydroxide precipitate was filtered, washed multiple times with distilled water, and dried at 110° C. to form a metal carbonate or hydroxide powder. Specific ranges of reaction conditions for the preparation of the samples are further outlined in Table 1, where the solution may not include both $Na_2Co_3$ and $NH_4OH$.

TABLE 1

| Reaction Process Condition | Values |
|---|---|
| Reaction pH | 6.0-12.0 |
| Reaction time | 0.1-24 hr |
| Reactor type | Batch |
| Reactor agitation speed | 200-1400 rpm |
| Reaction temperature | RT-80° C. |
| Concentration of the metal salts | 1-3M |
| Concentration of $Na_2CO_3$ (precipitating agent) | 1-4M |
| Concentration of $NH_4OH$ (chelating agent) | 0.2-2M |
| Flow rate of the metal salts | 1-100 mL/min |
| Flow rate of $Na_2CO_3$ & $NH_4OH$ | 1-100 mL/min |

An appropriate amount of $Li_2CO_3$ powder was combined with the dried metal carbonate or hydroxide powder and thoroughly mixed with a Jar Mill, double planetary mixer, or dry powder rotary mixer to form a homogenous powder mixture. A portion, e.g. 5 grams, of the homogenized powders was calcined in a step to form the oxide, followed by an additional mixing step to further homogenize the powder. The further homogenized powder was again calcined to form the highly crystalline lithium composite oxide. Specific ranges of calcination conditions are further outlined in Table 2 (scfh=a standard cubic foot per hour).

TABLE 2

| | Calcination Process Condition | Values |
|---|---|---|
| $1^{st}$ Step | temperature | 400-800° C. |
| | time | 1-24 hr |
| | protective gas | Nitrogen or Air |
| | Flow rate of protective gas | 0-50 scfh |
| $2^{nd}$ Step | temperature | 700-1100° C. |
| | time | 1-36 hr |
| | protective gas | Nitrogen or Air |
| | Flow rate of protective gas | 0-50 scfh |

The lithium metal oxide (LMO) positive electrode composite material particles thus formed generally have a substantially spherical shape and are relatively homogenous in size. The product composition was assumed to correspond to the portions of the metal reactants used to form the composition with the oxygen adjusting to yield the overall targeted oxidation state. A first cathode active composition was synthesized with an approximate stoichiometry comprising excess lithium with X=0.5 from the formula (x $Li_2MnO_3$·(1−x) $LiMO_2$) and 66 mole percent Mn as a fraction of the transition metal in the composition. A second cathode active composition was synthesized with an approximate stoichiometry comprising excess lithium with X=0.3 and 52 mole percent Mn as a fraction of the transition metals and with a 1 mole percent Mg dopant. Also, a third cathode active composition was formed with excess lithium with X=0.2 and with 51 mole percent Mn as a fraction of the transition metals. The coating of the active compositions is described in Examples 2, 5 and 7, respectively.

Example 2

Formation of Aluminum Halide Coated Metal Oxide Materials from Example 1

The lithium metal oxide (LMO) particles with the first composition prepared in Example 1 were coated with a thin layer of aluminum halide ($AlX_3$) using a solution-based method, where X can be F, Cl, Br, or I. The aluminum fluoride coated samples were prepared for comparison with the non-fluoride aluminum halides. The aluminum halide coated samples with the first active composition from Example 1 were used for the formation of lithium-based batteries as described in subsequent examples.

Figure 2:
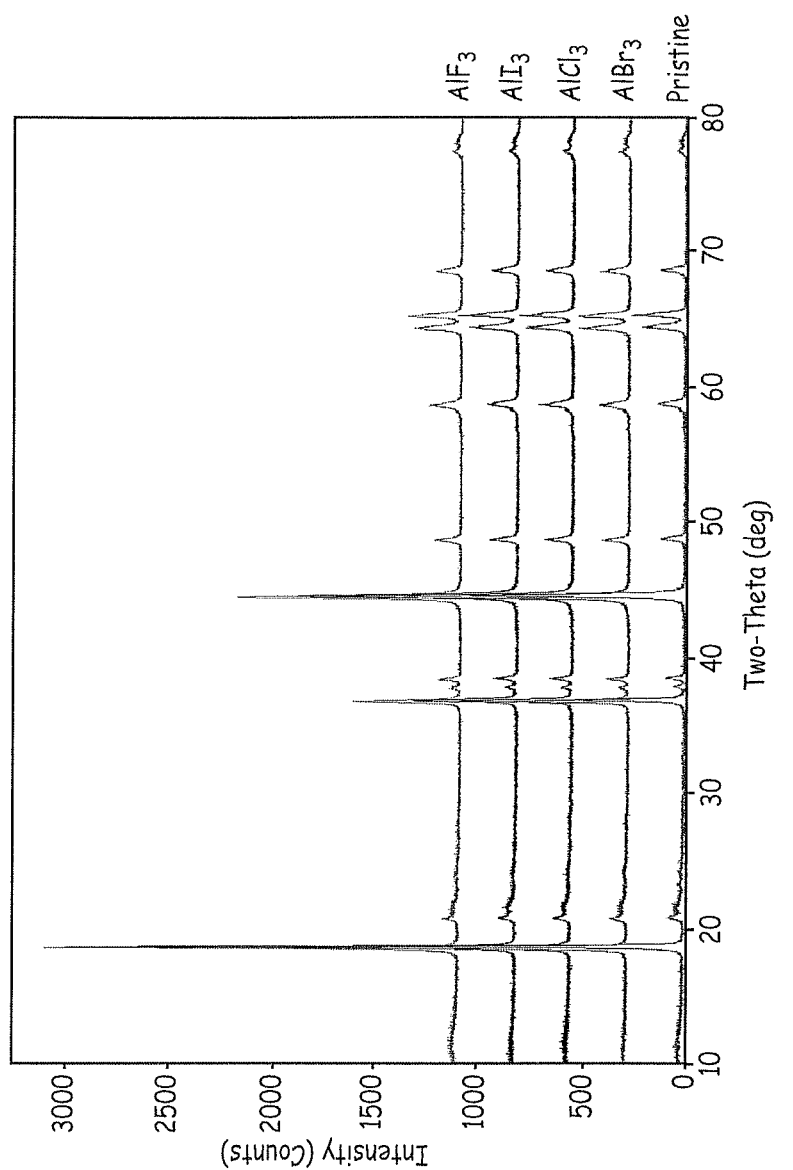
FIG. 2 is a plot of x-ray diffractograms for a first positive electrode active composition (X=0.5) in which the materials are uncoated or have a 0.5 mole percent coating of an aluminum halide. The first positive electrode active composition was used for obtaining the data shown in FIGS. 2-15.

For a selected amount of aluminum halide coating (0.05 mole percent coating), an appropriate amount of saturated solution of aluminum nitrate was prepared in an aqueous solvent. The metal oxide particles were then added into the aluminum nitrate solution to form a mixture. The mixture was mixed vigorously for a period of time to homogenize. The length of mixing depends on the volume of the mixture. After homogenization, a stoichiometric amount of ammonium halide, i.e., ammonium fluoride, ammonium chloride, ammonium bromide, or ammonium iodide, was added to the homogenized mixture to form aluminum halide precipitate as a coating on the particles. Upon the completion of the precipitation, the mixture was stirred at about 80° C. for 3-10 h. The mixture was then filtered and the solid obtained was washed repeatedly to remove any un-reacted materials. The solid was calcined in nitrogen atmosphere at 300-600° C. for 3-10 h to form the aluminum halide coated metal oxide material. The x-ray diffractograms are shown in FIG. 2 for the coated and the uncoated powders. As can be seen in FIG. 2, the coatings did not alter the crystal structure of the core active composition.

Figure 3:
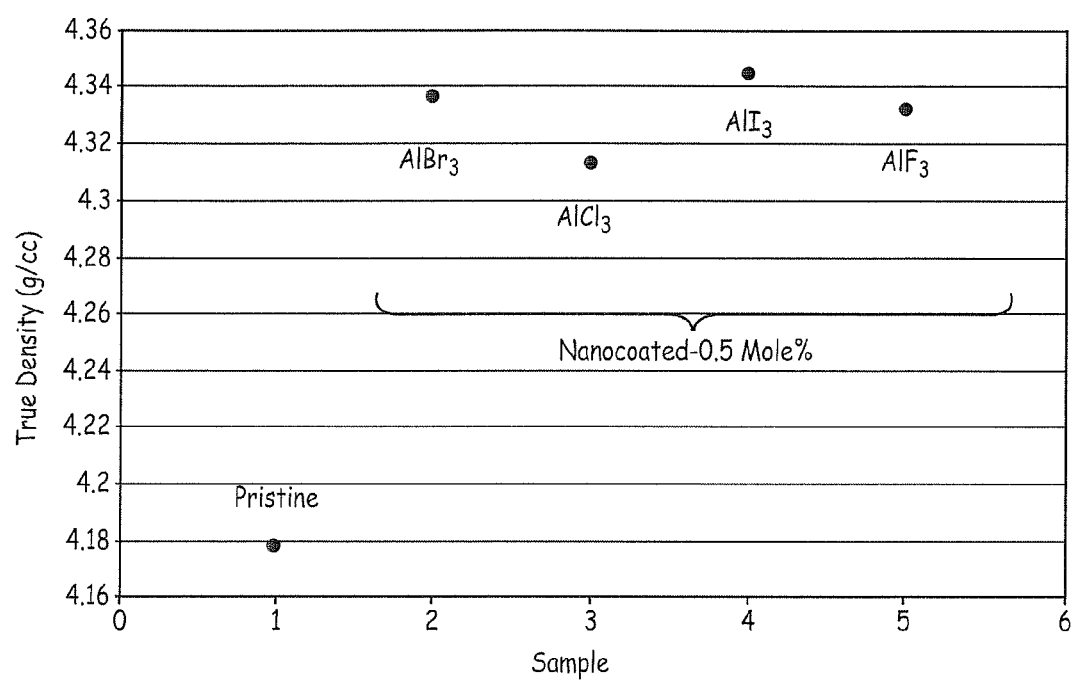
FIG. 3 is a histogram showing true density for the first set of positive electrode active materials uncoated or with 0.5 mole percent of an aluminum halide coating.
Figure 4:
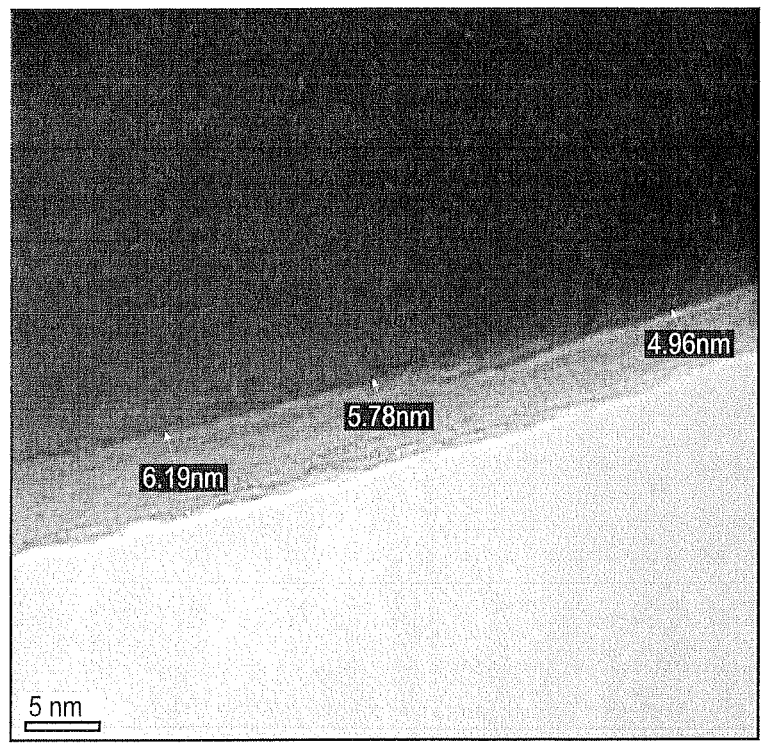
FIG. 4 is a transmission electron micrograph of a particle of lithium metal oxide with a nano-coating of $AlBr_3$.
Figure 5:
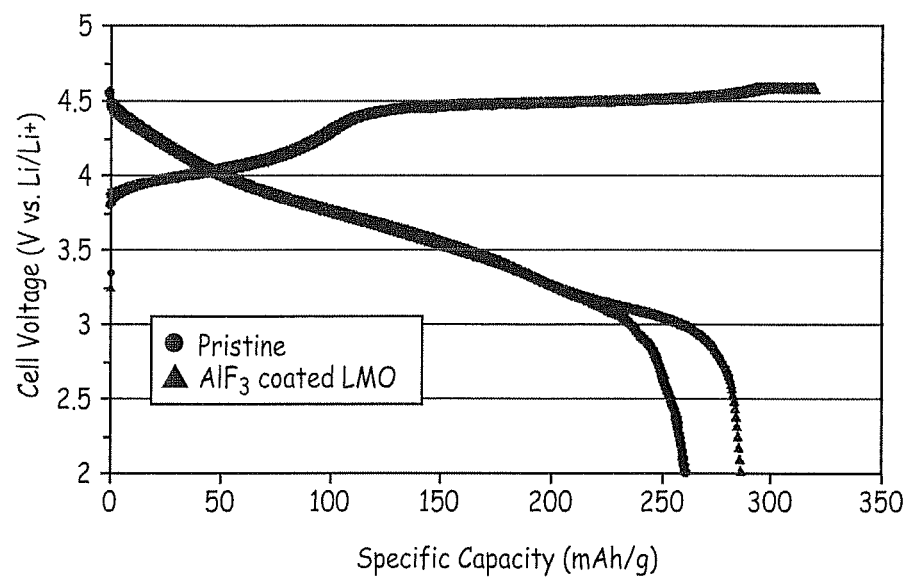
FIG. 5 is a set of plots of first cycle charge and discharge specific capacity with a charge and discharge between 4.6 and 2 volts for batteries with $AlF_3$ coated and uncoated lithium metal oxide materials with a discharge rate of 0.1 C.
Figure 6:
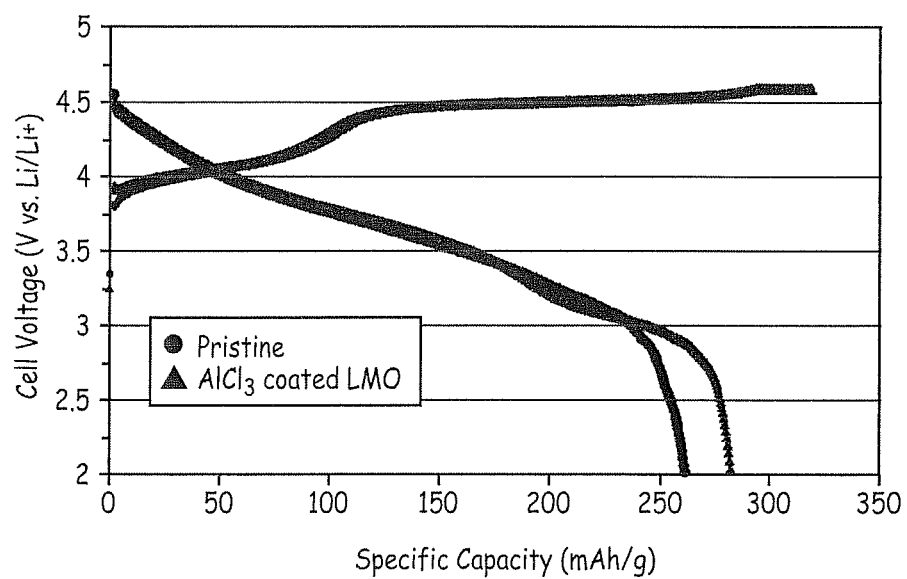
FIG. 6 is a set of plots of first cycle charge and discharge specific capacity with a charge and discharge between 4.6 and 2 volts for batteries with $AlCl_3$ coated and uncoated lithium metal oxide materials with a discharge rate of 0.1 C.
Figure 7:
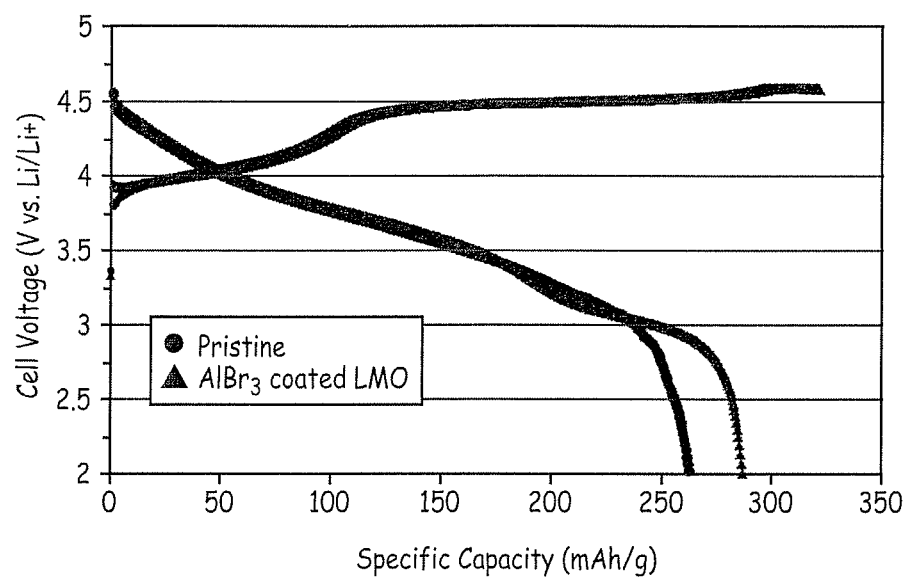
FIG. 7 is a set of plots of first cycle charge and discharge specific capacity with a charge and discharge between 4.6 and 2 volts for batteries with $AlBr_3$ coated and uncoated lithium metal oxide materials with a discharge rate of 0.1 C.
Figure 8:
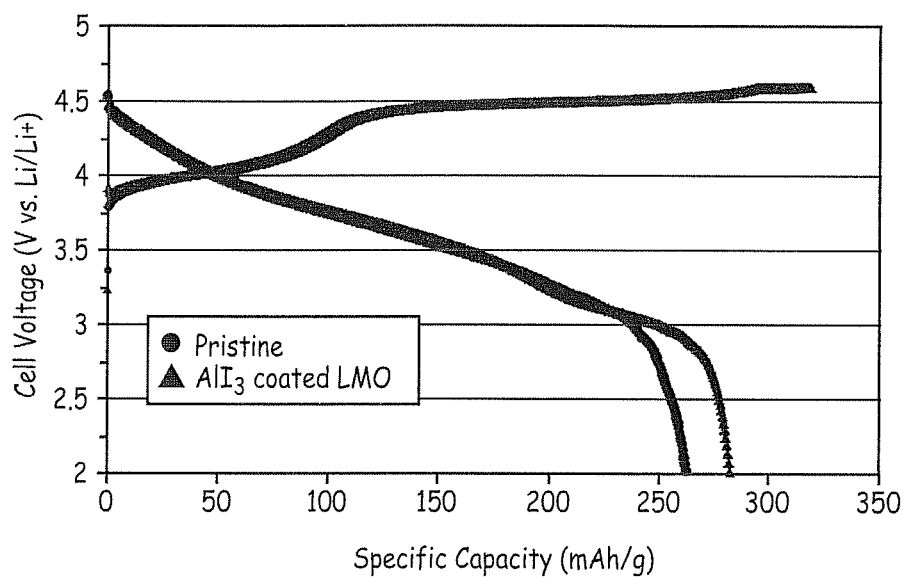
FIG. 8 is a set of plots of first cycle charge and discharge specific capacity with a charge and discharge between 4.6 and 2 volts for batteries with $AlI_3$ coated and uncoated lithium metal oxide materials with a discharge rate of 0.1 C.

The true density of the uncoated and coated compositions was obtained using helium picnometry. Referring to FIG. 3, the densities are plotted by sample number where sample 1 is the uncoated material and samples 2-5 are the coated samples where the nature of the coating is indicated in the figure. The true density is greater for the coated compositions than for the uncoated samples. Based on the higher densities for the coated compositions, it is expected that a higher electrode density can be obtained for the coated compositions. A transmission electron micrograph of a representative coated powder with 0.5 mole percent $AlBr_3$ is shown in FIG. 4. In general, the coatings were estimated to have thicknesses from about 4 nm to about 8 nm based on visual observation in micrographs.

Example 3

Coin Cell Batteries with Aluminum Halide Coated First Active Composition from Example 2

The aluminum halide coated samples from example 2 based on the first active composition described in example 1 above were used to test the performance of coin cell batteries. The coin cells were assembled following the procedure outlined above with positive electrode active materials with a coating based on one of the four different aluminum halides or without a coating. The first cycle charge and discharge specific capacity of the batteries are plotted in FIGS. 5-8 for batteries with pristine i.e. un-coated LMO and LMO coated with 0.5 mole percent $AlX_3$ (X=F, Cl, Br, or I) at a discharge rate of 0.1 C between 2.0 and 4.6 V.

The first cycle discharge capacity for pristine or un-coated LMO was approximately 261 mAh/g. In comparison, the first cycle discharge capacity for $AlF_3$ coated LMO plotted in FIG. 5 was approximately 275 mAh/g, about 15 mAh/g above the value of pristine LMO. The first cycle discharge capacity for $AlCl_3$ coated LMO plotted in FIG. 6 was approximately 283 mAh/g, about 22 mAh/g above the value of pristine LMO. The first cycle discharge capacity for $AlBr_3$ coated LMO plotted in FIG. 7 was approximately 287 mAh/g, about 26 mAh/g above the value of pristine LMO. The first cycle discharge capacity for $AlI_3$ coated LMO plotted in FIG. 8 was approximately 282 mAh/g, about 21 mAh/g above the value of pristine LMO.

Figure 9:
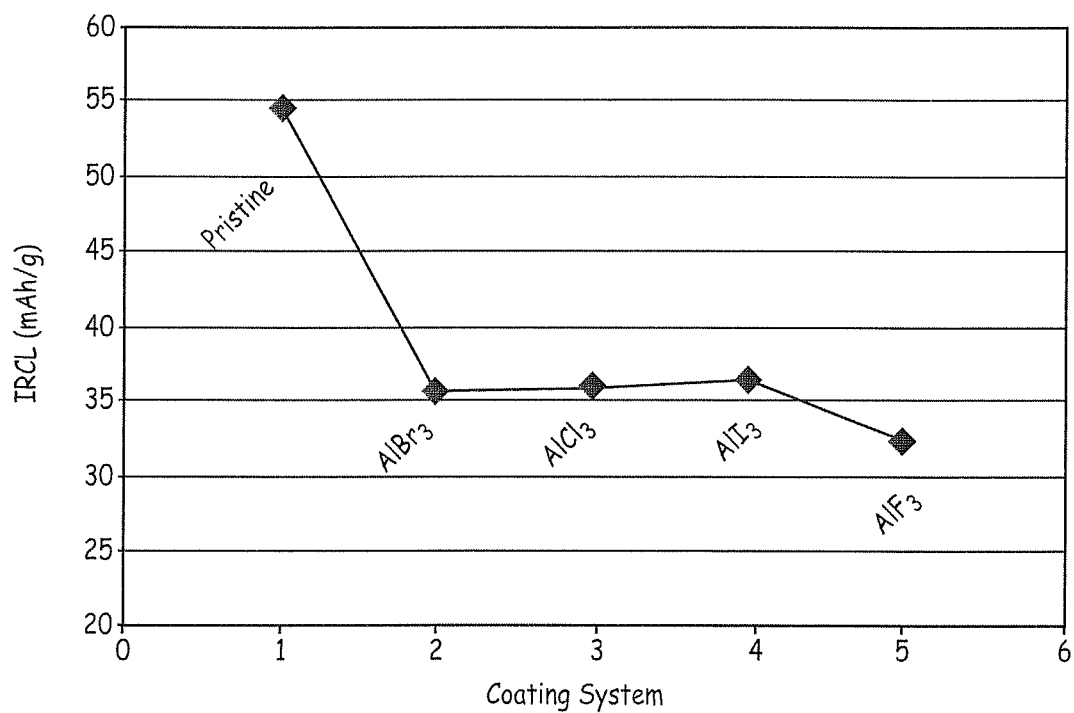
FIG. 9 is a plot of the first cycle irreversible capacity loss (IRCL) for pristine and various aluminum halide coated lithium metal oxide (LMO) compositions.

The irreversible capacity loss (IRCL) was measured for each of the samples along with the average voltage in the first cycle. The IRCL, average voltage, and specific discharge capacity results for various coatings are compared respectively in plots presented in FIGS. 9-11. The irreversible capacity loss (IRCL) of the pristine LMO was approximately 55 mAh/g, while the average voltage was approximately 3.590 V and 1 C discharge capacity was 197 mAh/g. The IRCL of the $AlF_3$ coated LMO was approximately 32 mAh/g, while the average voltage was 3.575 and 1 C discharge capacity was 246 mAh/g. The IRCL of the $AlCl_3$ coated LMO was approximately 36 mAh/g, while the average voltage was 3.558 and 1 C discharge capacity was 224 mAh/g. The IRCL of the $AlBr_3$ coated LMO was approximately 36 mAh/g, while the average voltage was 3.553 and 1 C discharge capacity was 242 mAh/g. The IRCL of the $AlI_3$ coated LMO was approximately 36 mAh/g, while the average voltage was 3.570 and 1 C discharge capacity was 225 mAh/g. The charge capacity, discharge capacity, IRCL, average voltage, and 1 C discharge capacity of the batteries are summarized in Table 3. The average voltage was obtained in the first discharge cycle for a discharge from 4.6V to 2V at a discharge rate of C/10.

TABLE 3

| System | C/10 Discharge (mAh/g) | C/3 Discharge (mAh/g) | 1 C Discharge (mAh/g) | IRCL (mAh/g) | Average Voltage (v) |
|---|---|---|---|---|---|
| Pristine | 267 | 233 | 197 | 55 | 3.590 |
| AlBr3 | 288 | 268 | 242 | 36 | 3.553 |
| AlCl3 | 286 | 265 | 224 | 36 | 3.558 |
| AlI3 | 284 | 264 | 225 | 36 | 3.570 |
| AlF3 | 288 | 274 | 246 | 32 | 3.575 |

Figure 10:
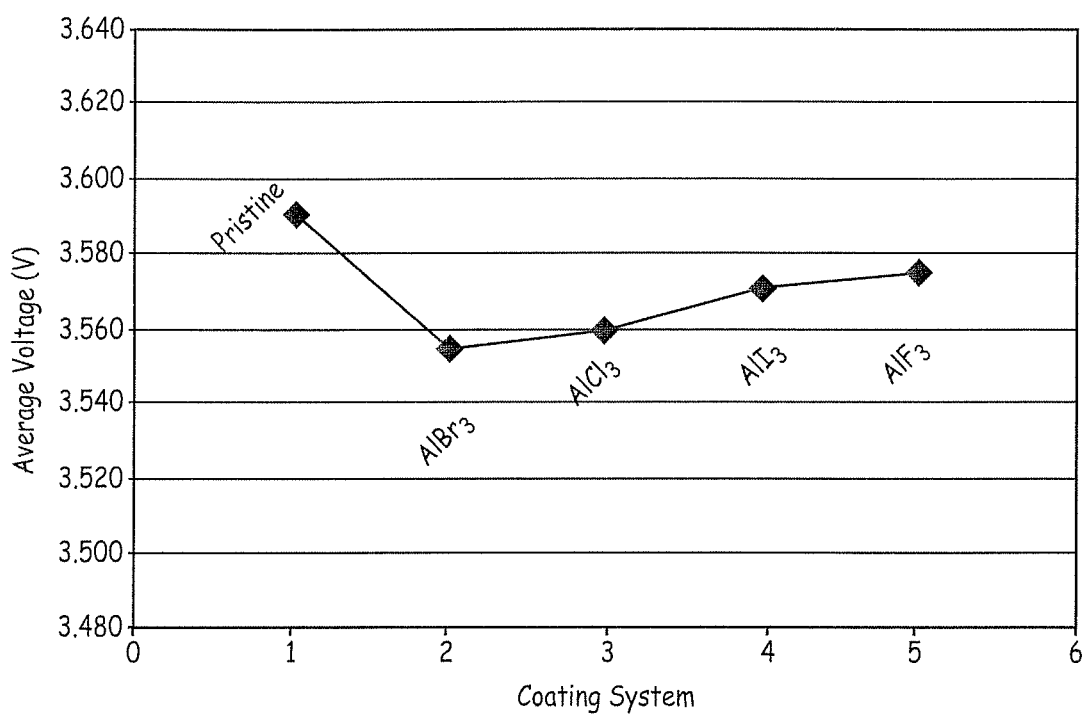
FIG. 10 is a plot of the average voltage for coin cell batteries formed with pristine and various 0.5 mole percent aluminum halide coated LMO compositions discharged from 4.6 to 2 volts.
Figure 11:
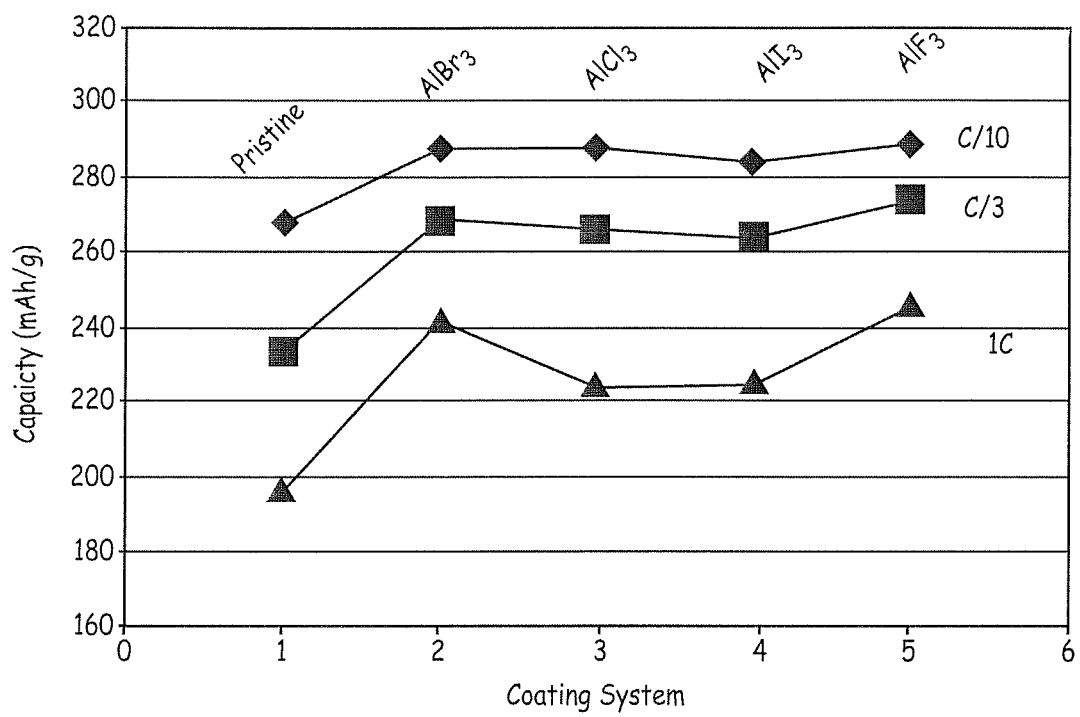
FIG. 11 is a plot of the discharge capacity for coin cell batteries with pristine and various 0.5 mole percent aluminum halide coated LMO compositions at discharge rates of 0.1 C, 0.33 C, and 1 C discharged from 4.6 to 2 volts.

The IRCL for pristine and various aluminum halide coated LMO compositions exhibit an approximately 20 mAh/g reduction in IRCL of coated LMO compared to the pristine LMO with the IRCL being slightly lower for the $AlF_3$ coating. The average voltage for pristine and various aluminum halide coated LMO compositions are compared in FIG. 10, showing on average less than 1% reduction in average voltage of coated LMO compared to the pristine LMO. The discharge capacity at rate 0.1 C, 0.33 C, and 1 C of pristine and various aluminum halide coated LMO compositions are compared in FIG. 11, showing on average more than 36 mAh/g increase in discharge capacity of coated LMO compared to the pristine LMO at rate 1 C, more than 34 mAh/g increase at rate 0.33 C, and more than 19 mAh/g increase at rate 0.1 C. The discharge capacity results for the active materials with an $AlBr_3$ coating had similar values to the corresponding results from the materials with an $AlF_3$ coating. In summary, metal halide coated LMO exhibits decreased IRCL and increased capacity while resulting in a modest decrease in average voltage, when compared with pristine, i.e., uncoated LMO.

Example 4

Cycling Performance for Batteries with Aluminum Halide Coated LMOs from Example 2

This example demonstrates how the battery cycling performance varied with respect to a range of aluminum halide coatings (0.5 mole percent) on the LMO active materials for various battery performance parameters. Coin cell batteries were formed from the materials synthesized as described in Example 2 using the process and coin cell structure described above.

Figure 12:
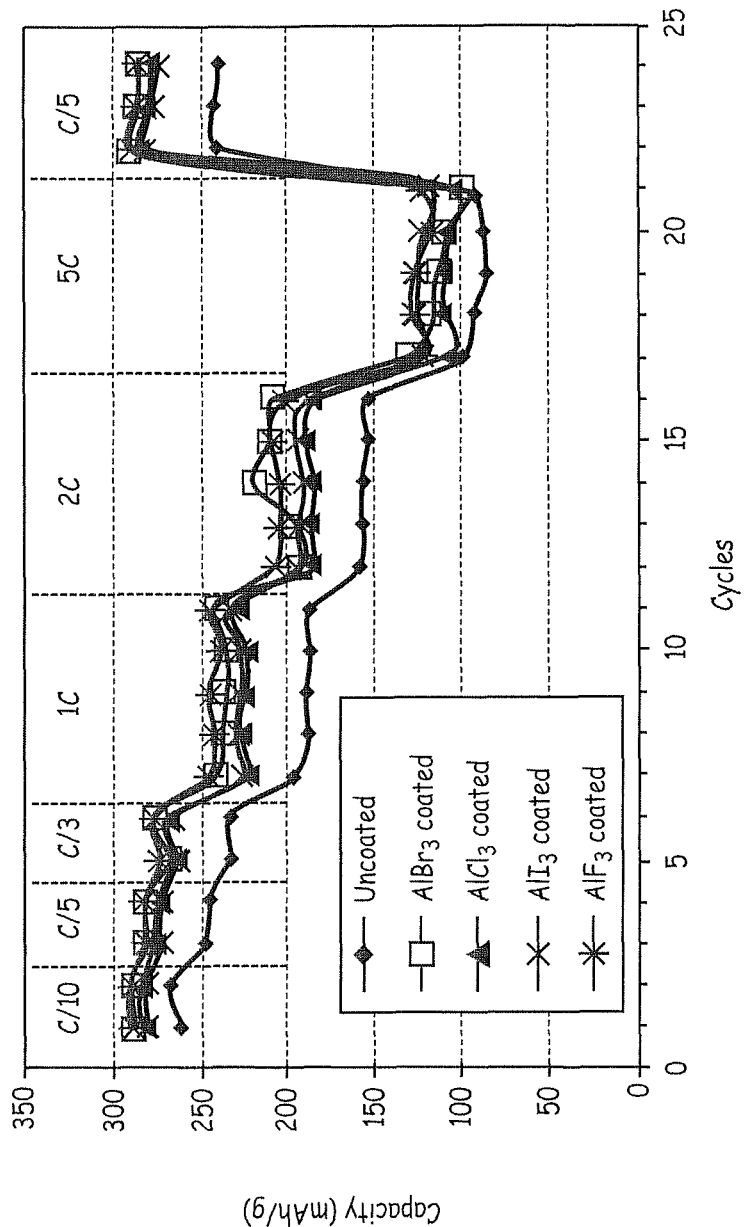
FIG. 12 is a set of plots of specific discharge capacity versus cycle number for coin cell batteries with pristine and various 0.5 mole percent aluminum halide coated LMO compositions cycled between 4.6 and 2 volts at 0.1 C for the first two cycles, 0.2 C for cycle numbers three and four, 0.33 C for cycle numbers five and six, 1.0 C for cycle numbers 7 to 11, 2.0 C for cycle numbers 12 to 16, 5.0 C for cycle numbers 17 to 21, and 0.2 C for cycle numbers 22 to 24.

A first set of coin cell batteries were cycled at room temperature between 2.0V and 4.6V to evaluate their performance. The first two cycles were measured at a charge/discharge rate of 0.1 C. The next two cycles, 3 and 4, were measured at a charge/discharge rate of 0.2 C. The next two cycles, 5 and 6, were measured at a charge rate of 0.2 C and a discharge rate of 0.33 C. The next five cycles, 7-11, were measured at a charge rate of 0.2 C and a discharge rate of 1.0 C. The next five cycles, 12-16, were measured at a charge rate of 0.2 C and a discharge rate of 2.0 C. The next five cycles, 17-21, were measured at a charge rate of 0.2 C and a discharge rate of 5.0 C. The next three cycles, 22-24, were measured at a charge/discharge rate of 0.2 C. Specific capacity versus cycle number of the coin cell batteries formed from pristine LMO and LMO coated with $AlF_3$, $AlBr_3$, $AlCl_3$, and $AlI_3$, were tested and the results are shown in FIG. 12. In general, metal halide coated LMO exhibits consistently increased discharge capacity throughout the cycles relative to batteries formed with the uncoated materials.

Figure 13A:
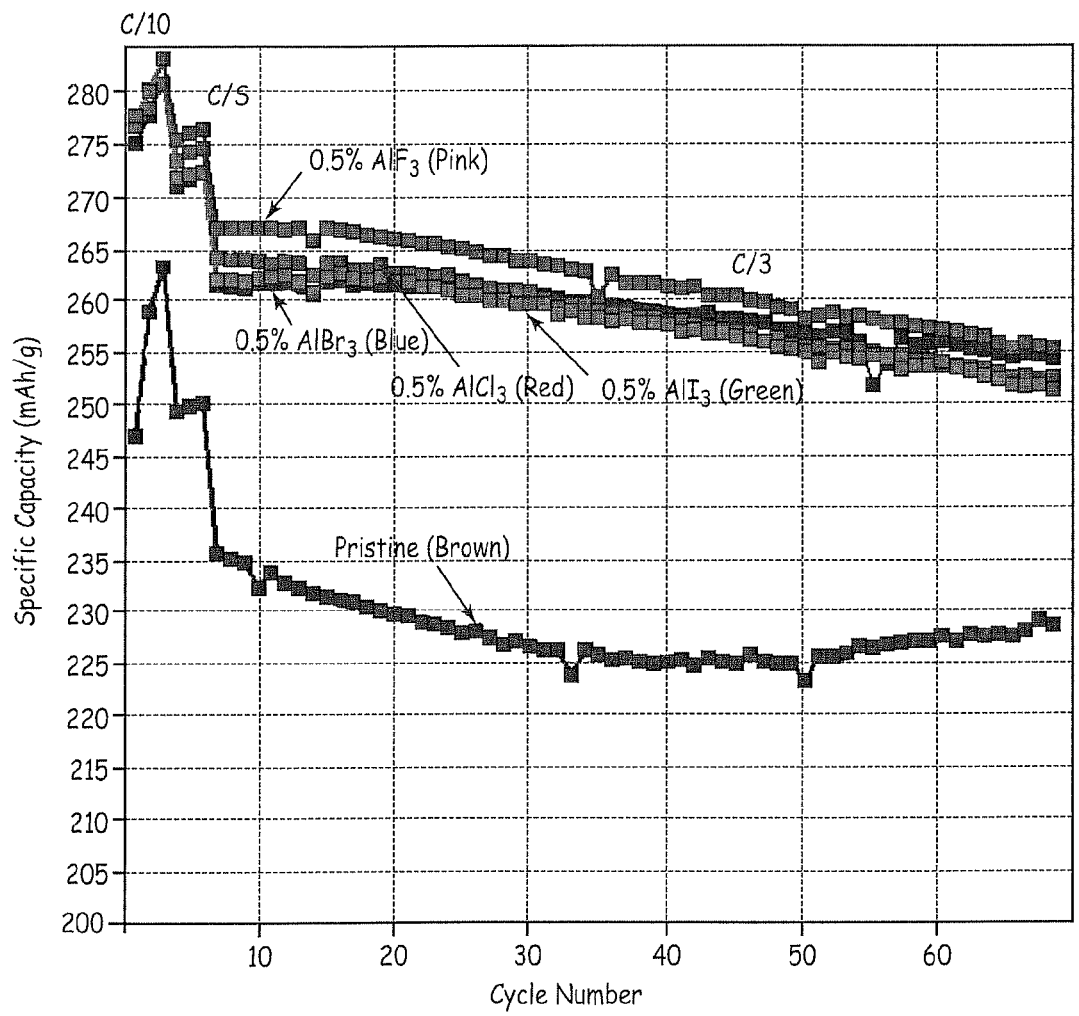
FIG. 13A is a set of plots of specific capacity as a function of cycle number for coin cell batteries with pristine and various aluminum halide coated first LMO composition cycled between 4.6 and 2 volts at 0.1 C for the first three cycles, 0.2 C for cycle numbers 4-6, and 0.33 C for cycles 7-68.

A second set of coin cell batteries were cycled at a charge/discharge rate of 0.1 C for the first three cycles, 0.2 C for cycles 4-6 and at C/3 for cycles 7-68. The specific capacity as a function of cycle is plotted in FIG. 13A. The batteries formed with the coated samples had significantly greater specific capacities with cycling. The batteries formed with the active material coated with $AlF_3$ exhibited greater specific capacity over this cycling range, but the batteries formed with the active material coated with $AlBr_3$ exhibited somewhat less capacity fade, which is seen in Table 4 with respect to the cycle life efficiency. The results are summarized in Table 4.

TABLE 4

| System | C/10 Discharge (mAh/g) | C/3 Discharge - 7th cycle (mAh/g) | C/3 Discharge - 50th cycle (mAh/g) | C/3 Discharge - 68th cycle (mAh/g) | C/3 Cycle life efficiency - 7-50th cycle (%) | C/3 Cycle life efficiency - 7-68th cycle (%) |
|---|---|---|---|---|---|---|
| Pristine | 247 | 236 | 223 | 229 | 94.49 | Soft short |
| AlBr3 | 275 | 262 | 257 | 254 | 98.09 | 96.95 |
| AlCl3 | 278 | 264 | 256 | 253 | 96.97 | 95.83 |
| AlI3 | 277 | 262 | 255 | 251 | 97.33 | 95.80 |
| AlF3 | 278 | 267 | 258 | 255 | 96.63 | 95.51 |

Figure 13B:
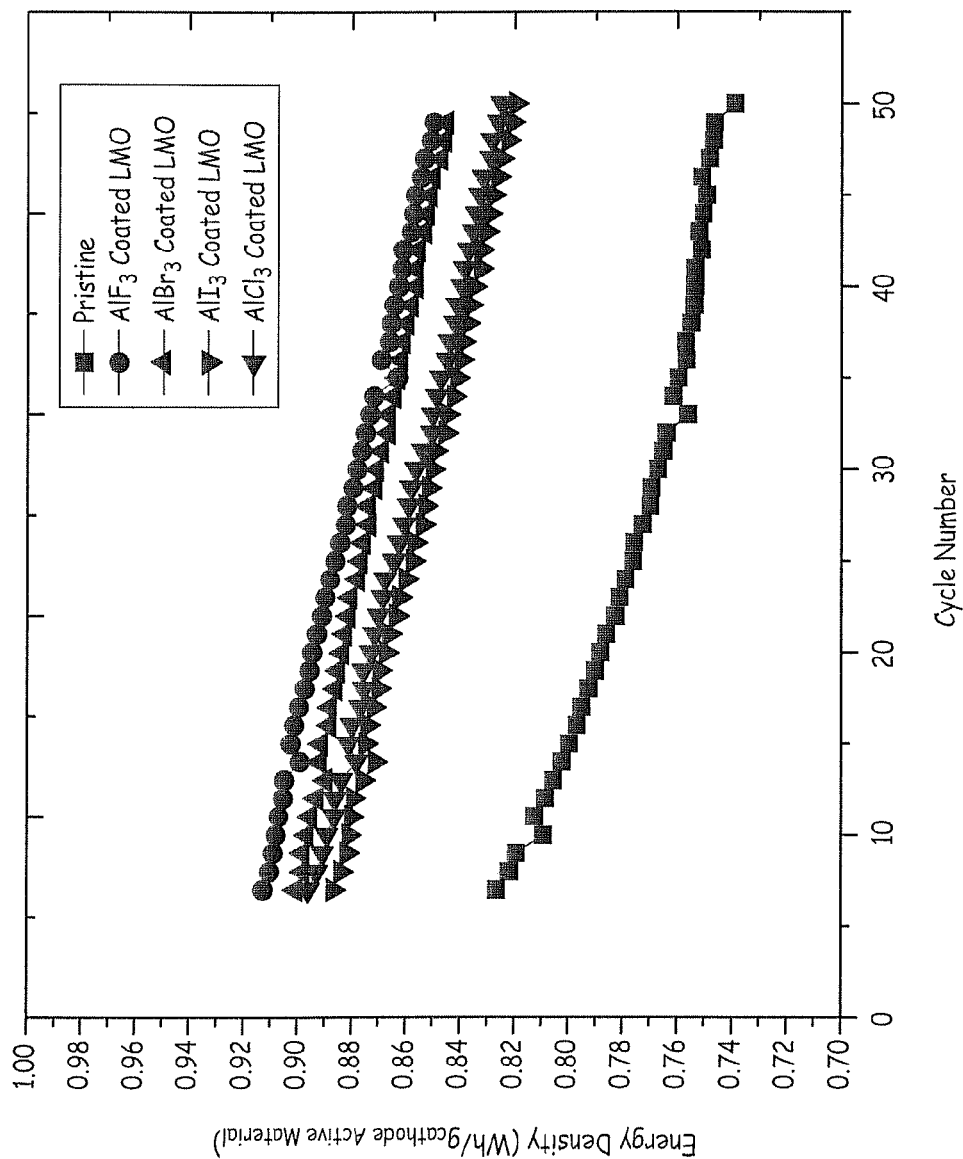
FIG. 13B is a set of plots of energy density as a function of cycles for the coin cell batteries as described for FIG. 13A.
Figure 14:
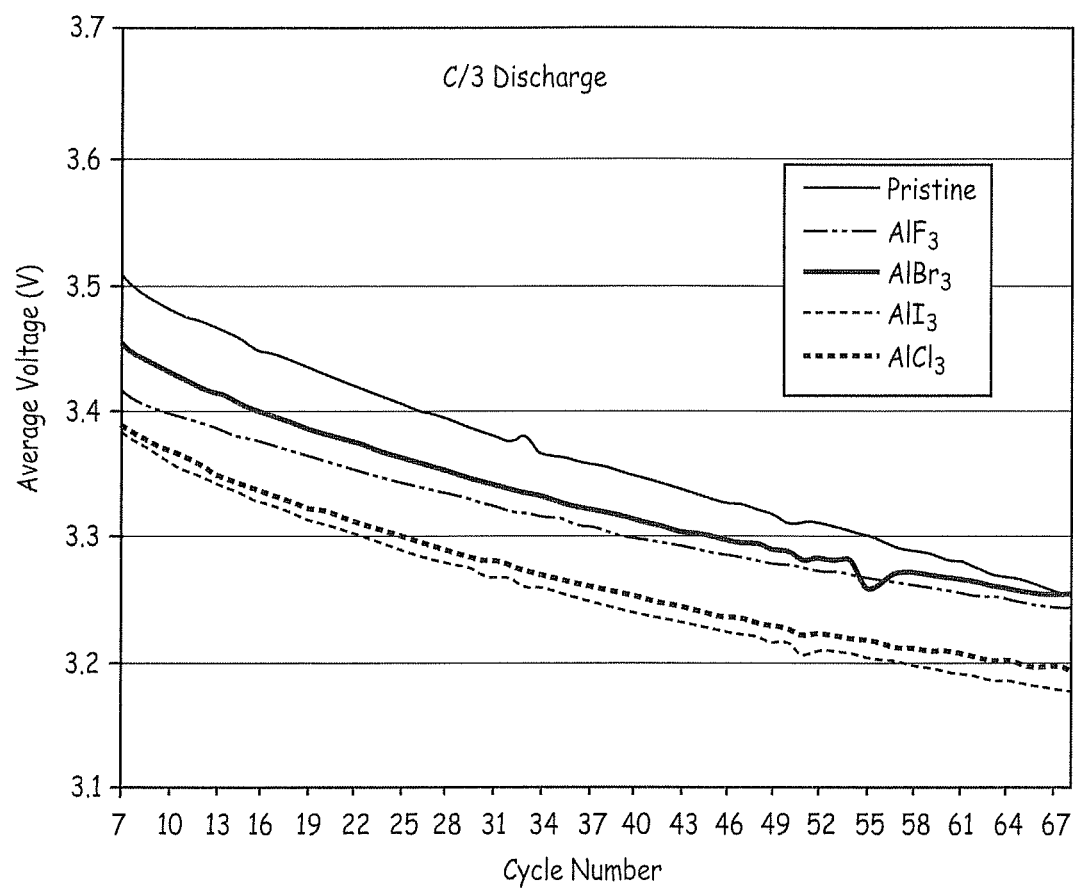
FIG. 14 is a plot of average voltage for the coin cell batteries cycled between 4.6 volts and 2.0 volts as used for the plots in FIG. 13 for cycles 7-68 at a discharge rate of C/3.
Figure 15:
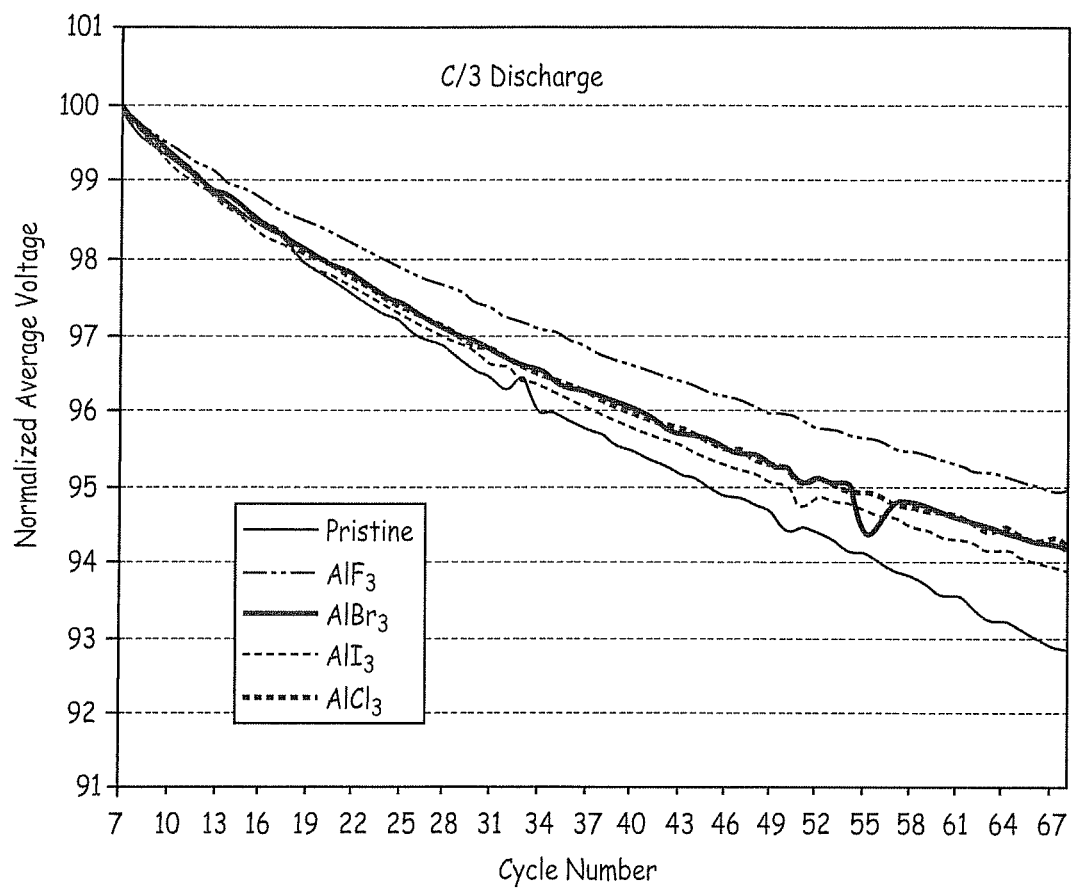
FIG. 15 is a set of plots of the normalized average voltages from FIG. 14.

Corresponding energy densities are plotted in FIG. 13B up to 50 cycles where the energy density is obtained by multiplying specific capacity times the average voltage. The average voltage over cycling is plotted in FIG. 14 and the normalized average voltage is plotted in FIG. 15. The batteries formed with the uncoated active material had a slightly greater average voltage, but the average voltage exhibited greater fade with cycling compared with the average voltage of batteries formed with the coated active materials.

Example 5

Synthesis of Aluminum Halide Coated Second Cathode Active Material

This example is directed to coatings formed on particles of the second lithium metal oxide compositions described in Example 1 based on the coating methods as described in Example 2. Specifically, selected portions of the lithium metal oxide (LMO) particles with the second composition were coated with various amount of aluminum halide including aluminum fluoride, aluminum chloride, aluminum bromide, or aluminum iodide using the solution-based method outlined in Example 2 to prepare LMO coated with 0.2 mole %, 0.5 mole %, 1.0 mole %, or 2.0 mole % $AlX_3$ (X=F, Cl, Br, or I).

Figure 16:
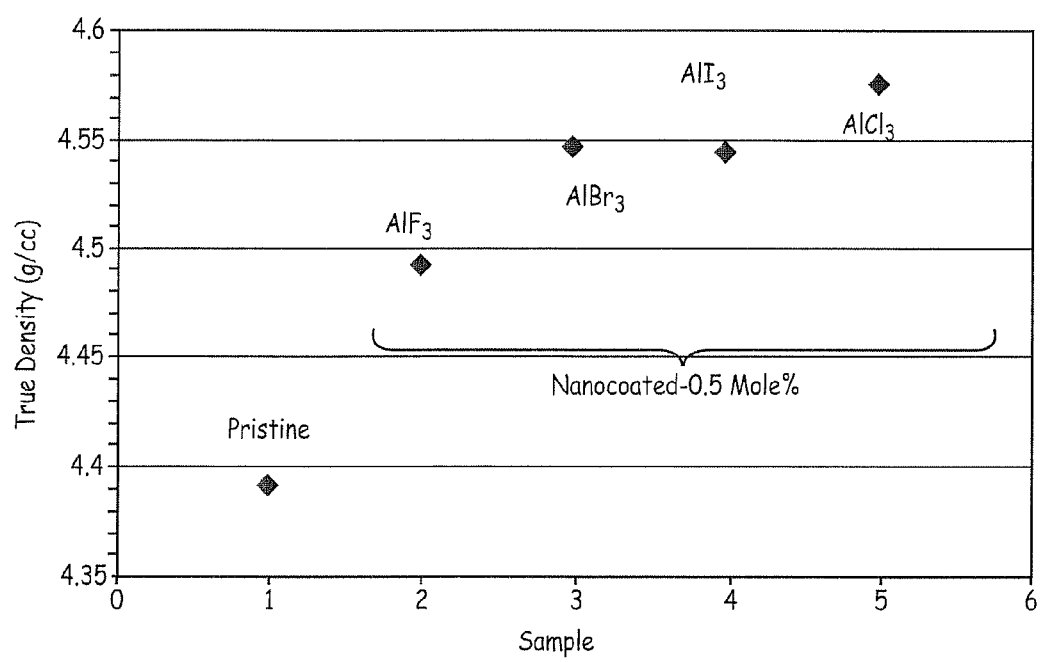
FIG. 16 is a histogram showing true density for a second set of positive electrode active material (X=0.3) uncoated or with 0.5 mole percent of an aluminum halide coating. The second positive electrode active material active was used to obtain the data in FIGS. 16-31.
Figure 17:
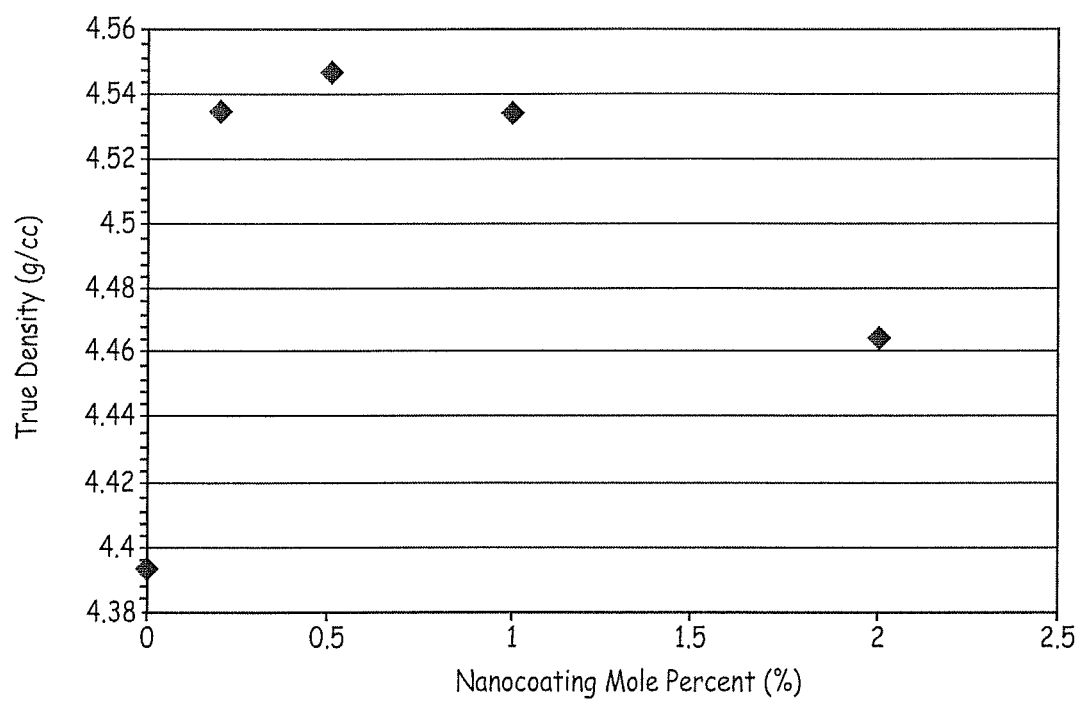
FIG. 17 is a plot of true density as a function of mole percent of $AlBr_3$ coating composition for the second set of positive electrode active materials.

The true density of the uncoated and coated compositions was obtained using helium picnometry. Referring to FIG. 16, the densities are plotted by sample number where sample 1 is the uncoated material and samples 2-5 are the coated samples where the nature of the coating is indicated in the figure. The true density is greater for the coated compositions than for the uncoated samples. Based on the higher densities for the coated compositions, it is expected that a higher electrode density can be obtained for the coated compositions. For the aluminum bromide coated samples, the density was obtained as a function of the mole percent of the coating, and the results are plotted in FIG. 17. The densities for all coating amounts were greater than the density of the uncoated powders, but the results suggest a decrease in density for greater amounts of coating compositions, e.g., 2 mole percent or greater.

Figure 18:
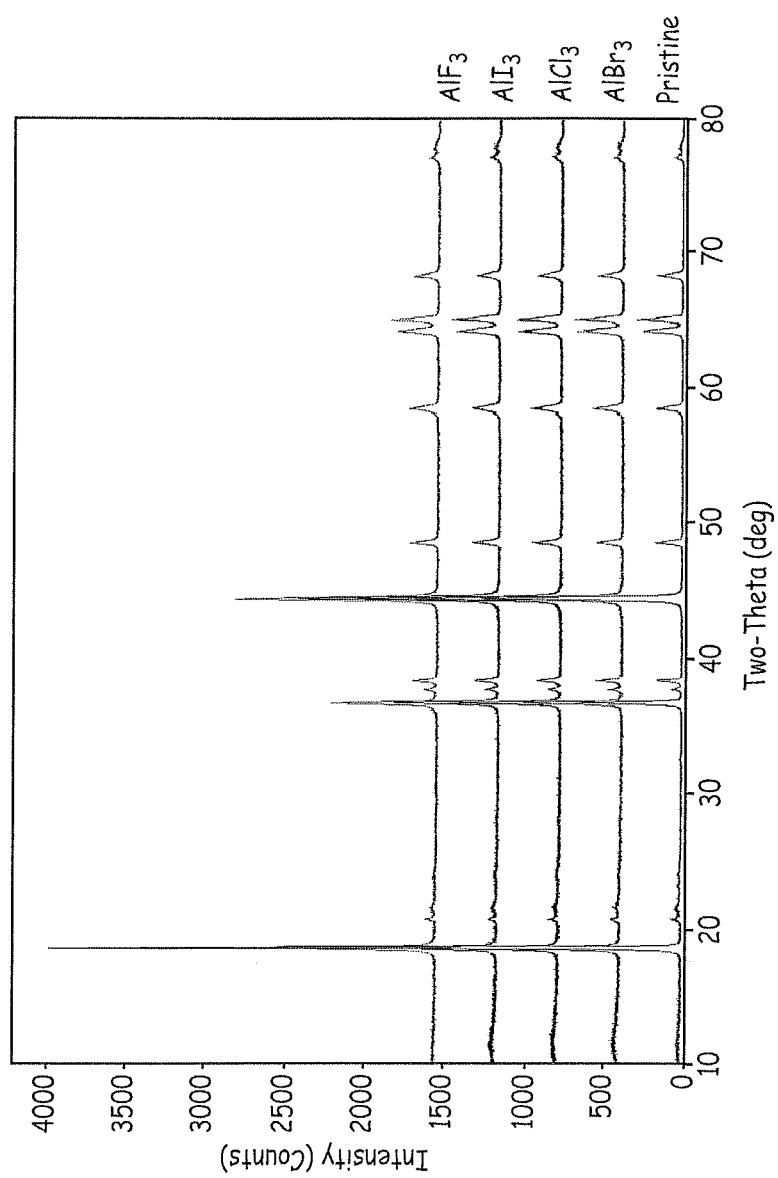
FIG. 18 is a plot of x-ray diffractograms for a second positive electrode active composition in which the materials are uncoated or have a 0.5 mole percent coating of an aluminum halide.

Plots of x-ray diffractograms are shown in FIG. 18. The x-ray diffractograms for all of the samples were essentially equivalent indicating that the coatings did not alter the structure of the core active material upon formation of the coating.

Figure 19A:
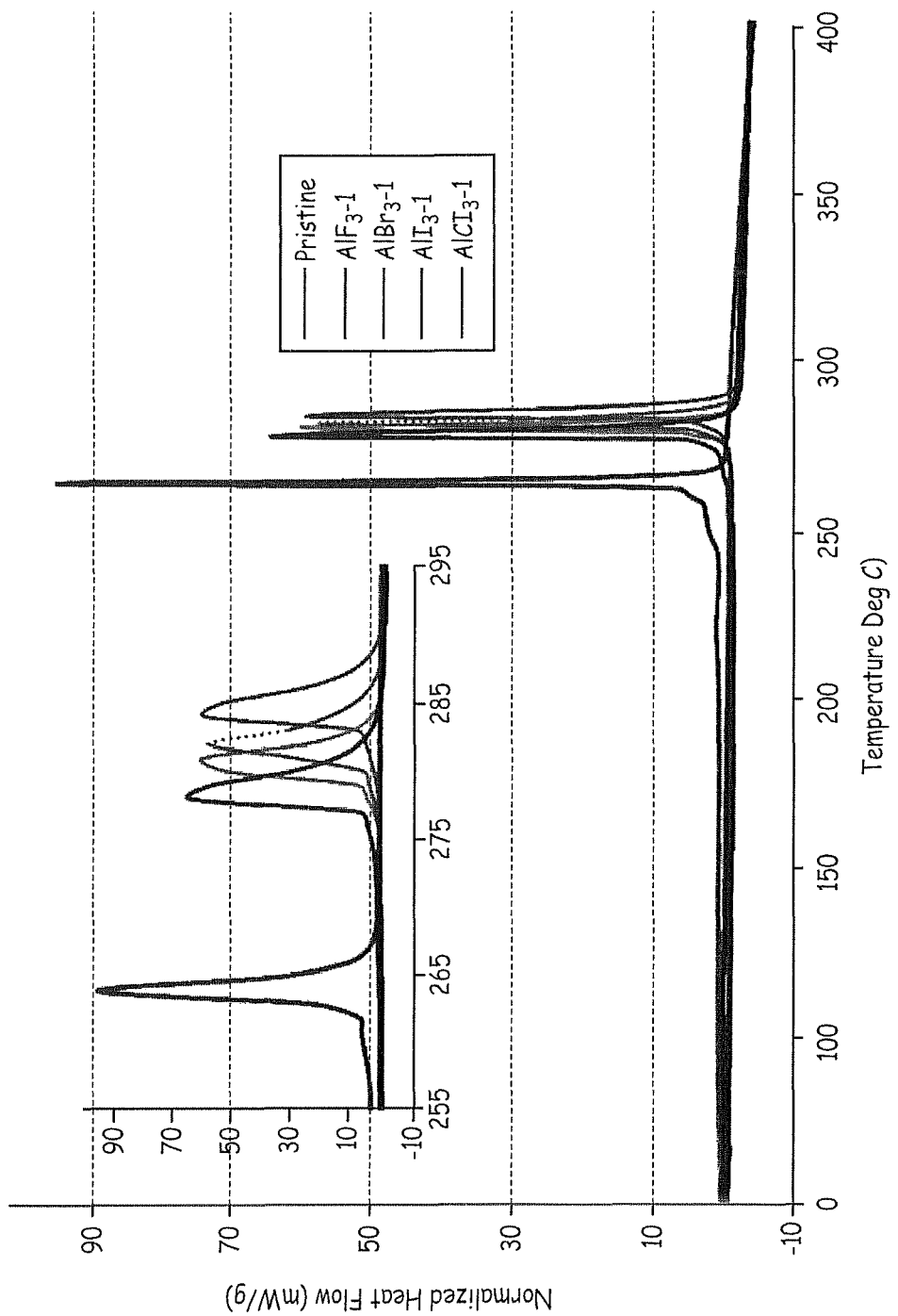
FIG. 19A is a plot of normalized heat flow as a function of temperature from differential scanning calorimetry measurements for uncoated samples and for samples coated with 0.5 mole percent of an aluminum halide ($AlF_3$, $AlCl_3$, $AlBr_3$ or $AlI_3$).
Figure 19B:
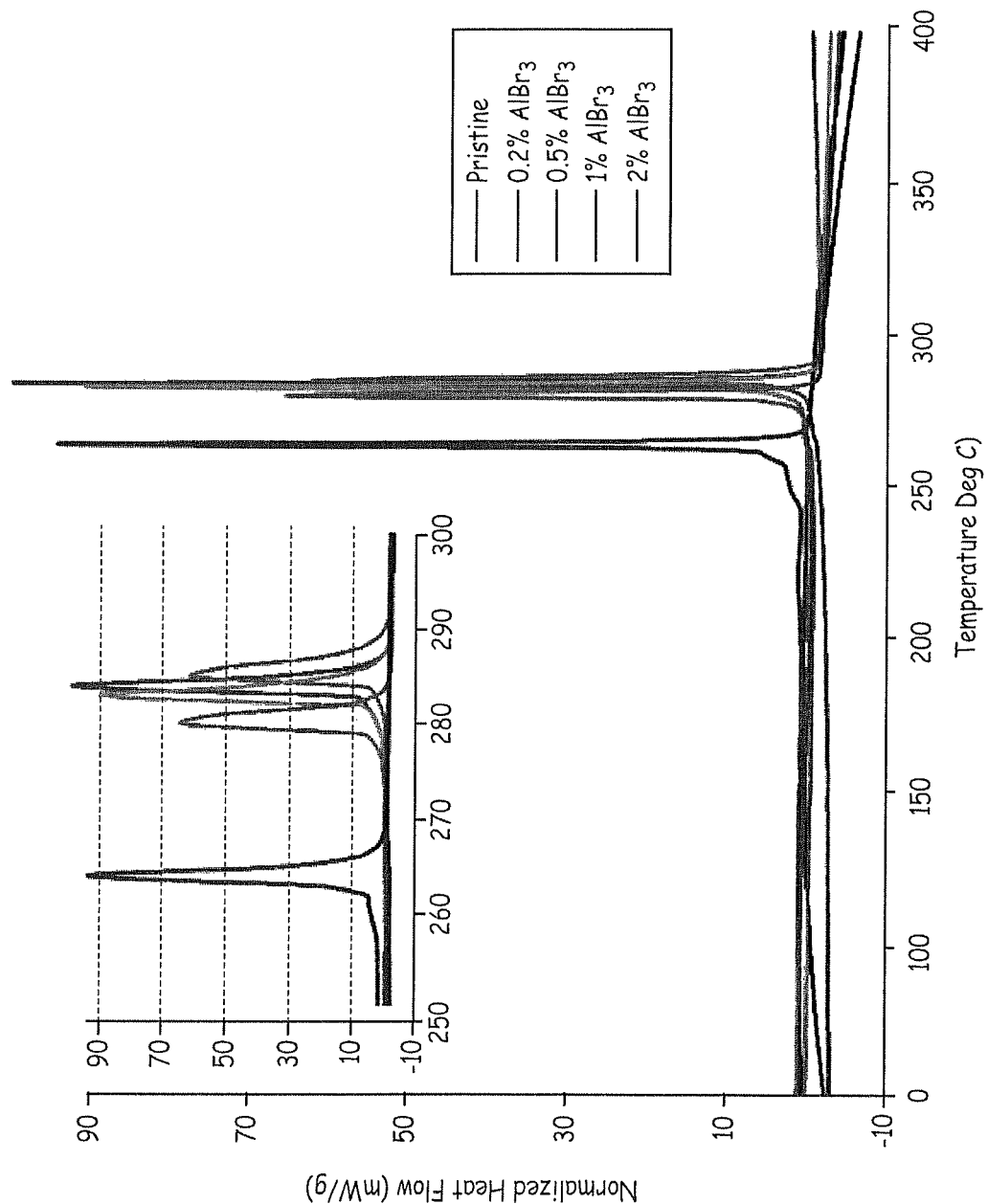
FIG. 19B is a plot of normalized heat flow as a function of temperature from differential scanning calorimetry measurements for uncoated samples and for samples coated with different mole percent of $AlBr_3$.

The stability of the cathode active materials was studied using differential scanning calorimetry (DSC). The DSC results are shown in FIG. 19A for uncoated LMO particles and particles with 4 different aluminum halide coatings with 0.5 weight percent coating material. Also, DSC results are plotted in FIG. 19B for four different coating amounts of $AlBr_3$ with the results for uncoated LMO for comparison. Peaks in the heat flow as a function of temperature indicate a phase transition or similar change of the material. From FIG. 19A, it can be seen that all of the aluminum halide coatings stabilize the material relative to the low temperature active phase, although there was some spread with respect to specific coating composition. A seen in FIG. 19B, the stabilization with respect to temperature is relatively independent of the amount of coating material. Based on the DSC results, it is expected that batteries formed with the coated materials should exhibit greater temperature stability at higher temperatures relative to batteries formed with the uncoated materials.

Example 6

Coin Cell Batteries with Aluminum Halide Coated LMOs from Example 5

The aluminum halide coated LMOs from Example 5 were used to form coin cell batteries following the procedure outlined above. The cells were cycled to evaluate their performance.

To evaluate a first set of coin cell batteries, the first two cycles were measured at a charge/discharge rate of 0.1 C from 4.6 to 2.0 volts. The next two cycles, 3 and 4, were measured at a charge/discharge rate of 0.2 C. The next two cycles, 5 and 6, were measured at a charge rate of 0.2 C and a discharge rate of 0.33 C. The next five cycles, 7-11, were measured at a charge rate of 0.2 C and a discharge rate of 1.0 C. The next five cycles, 12-16, were measured at a charge rate of 0.2 C and a discharge rate of 2.0 C. The next five cycles, 17-21, were measured at a charge rate of 0.2 C and a discharge rate of 5.0 C. The next three cycles, 22-24, were measured at a charge/discharge rate of 0.2 C. Specific capacity versus cycle number of the coin cell batteries formed from pristine LMO and LMO coated with 0.2 mole %, 0.5 mole %, 1.0 mole %, or 2.0 mole % $AlF_3$, $AlCl_3$, $AlBr_3$, and $AlI_3$ were tested and the results are shown in FIGS. 20-23, respectively.

Figure 20:
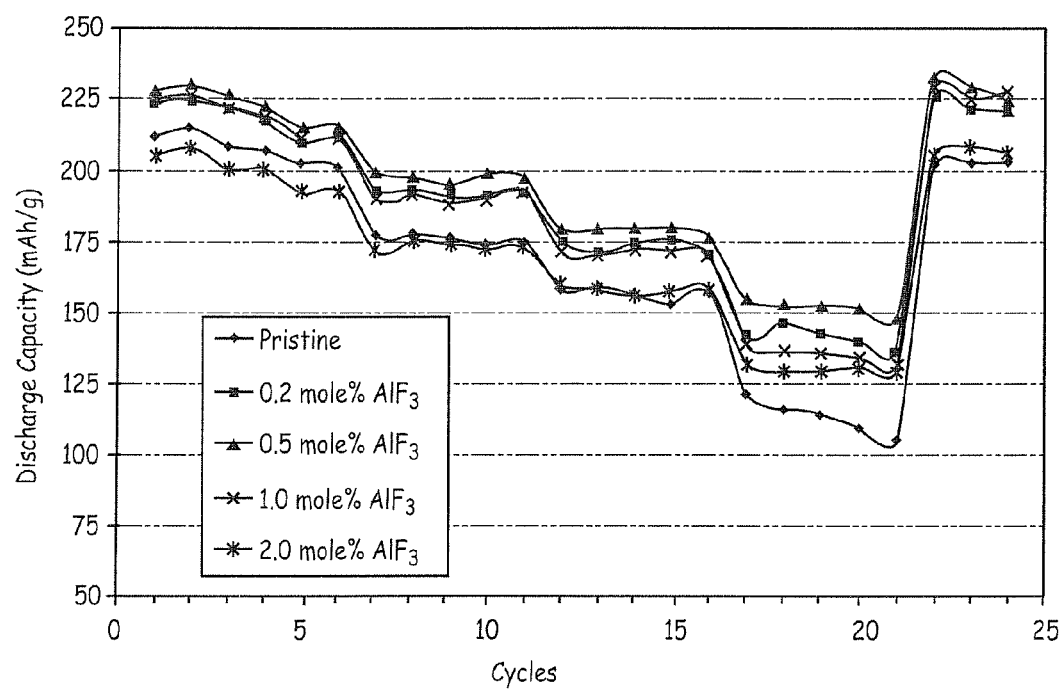
FIG. 20 is a set of plots of specific discharge capacity versus cycle number of pristine and LMO coated with 0.2 mole %, 0.5 mole %, 1.0 mole %, and 2.0 mole % $AlF_3$.
Figure 21:
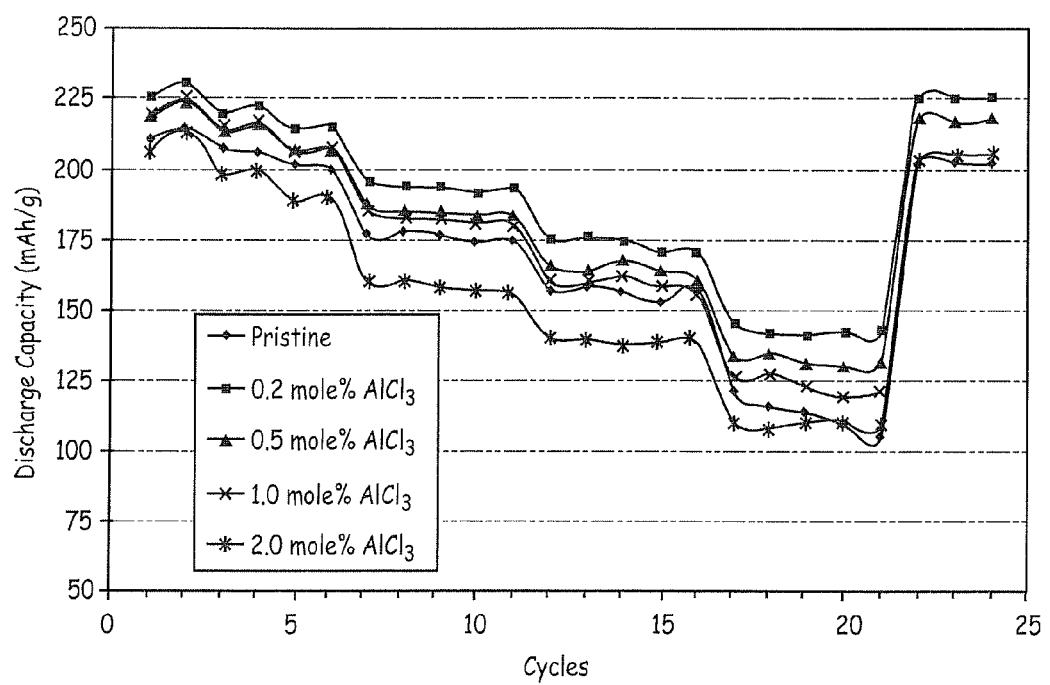
FIG. 21 is a set of plots of specific discharge capacity versus cycle number of pristine and LMO coated with 0.2 mole %, 0.5 mole %, 1.0 mole %, and 2.0 mole % $AlCl_3$.
Figure 22:
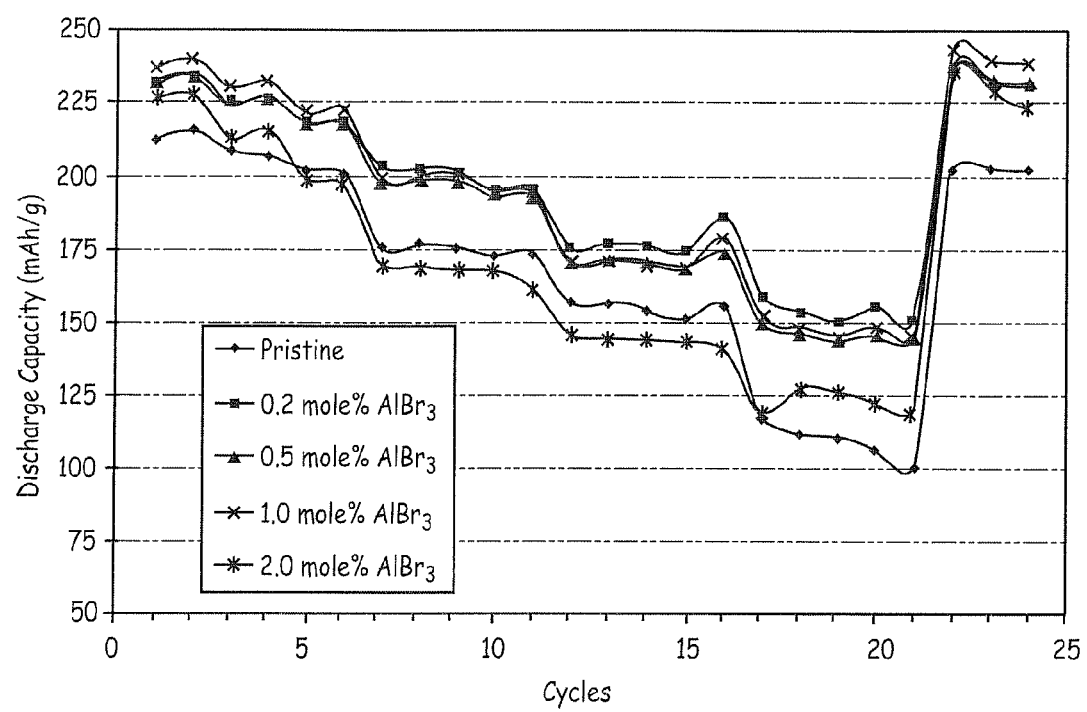
FIG. 22 is a set of plots of specific discharge capacity versus cycle number of pristine and LMO coated with 0.2 mole %, 0.5 mole %, 1.0 mole %, and 2.0 mole % $AlBr_3$.
Figure 23:
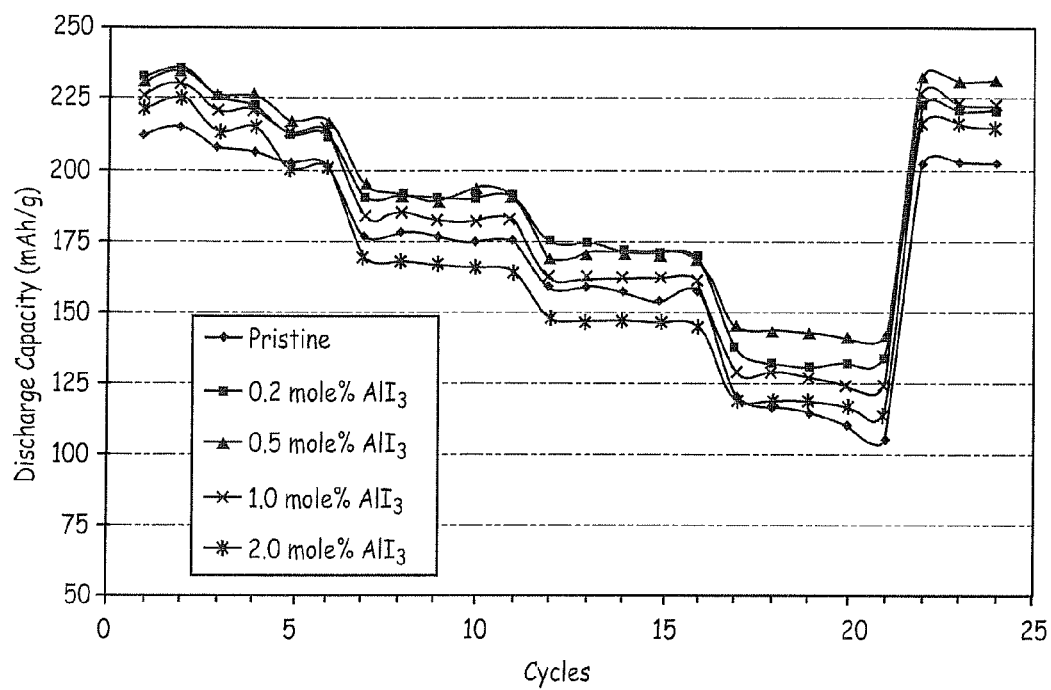
FIG. 23 is a set of plots of specific discharge capacity versus cycle number of pristine and LMO coated with 0.2 mole %, 0.5 mole %, 1.0 mole %, and 2.0 mole % $AlI_3$.

As shown in FIG. 20, batteries formed with LMO coated with 0.2 mole %, 0.5 mole %, or 1.0 mole % $AlF_3$ exhibited in general a consistent increase in discharge capacity compared to the LMO coated with 2.0 mole % $AlF_3$ and pristine LMO throughout the cycles. Batteries coated with 0.5 mole % $AlF_3$ exhibited the highest discharge capacity at all discharge rates. As shown in FIG. 21, batteries formed with LMO coated with 0.2 mole % $AlCl_3$ exhibited consistent increase in discharge capacity compared to the LMO coated with 0.5 mole %, 1.0 mole %, and 2.0 mole % $AlCl_3$, which are consistently better than the pristine LMO throughout the cycles. As shown in FIG. 22, batteries formed with LMO coated with 0.2 mole %, 0.5 mole %, or 1.0 mole % $AlBr_3$ exhibited comparable cycling profiles and in general has consistent increase in discharge capacity compared to the LMO coated with 2.0 mole % $AlBr_3$ and pristine LMO throughout the cycles. As shown in FIG. 23, LMO coated with 0.2 mole %, 0.5 mole %, or 1.0 mole % $AlI_3$ exhibited comparable cycling profiles and in general has consistent increase in discharge capacity compared to the LMO coated with 2.0 mole % $AlI_3$ and pristine LMO throughout the cycles.

Figure 24:
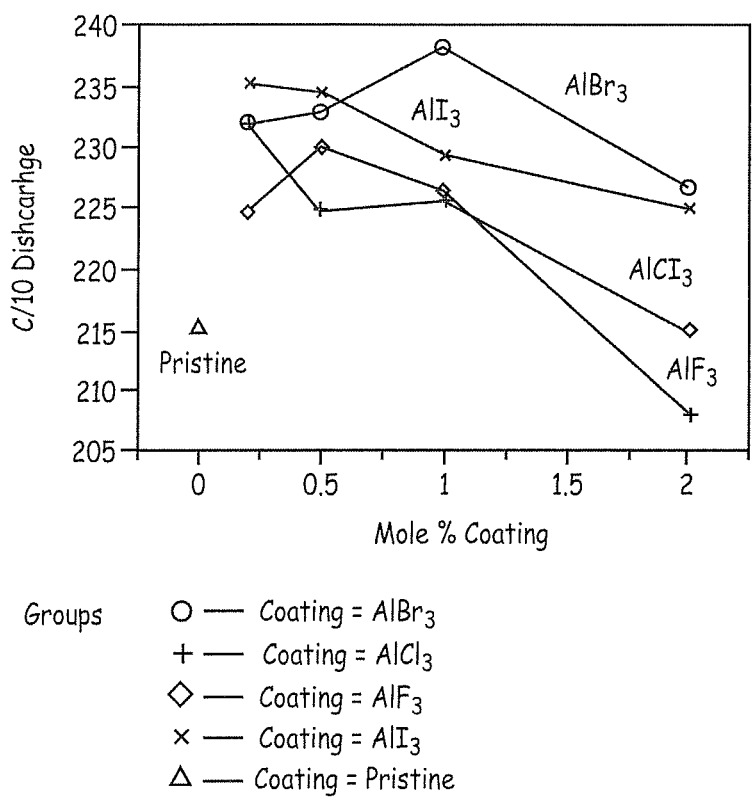
FIG. 24 is a set of plots of specific discharge capacities at 0.1 C discharge rate versus mole % coating of batteries with pristine LMO and LMO coated with various mole percentages of aluminum halides.

The specific discharge capacities at discharge rates of 0.1 C for batteries with LMO coated with various mole percentages of aluminum halides were compared and the results are shown in FIG. 24. While 0.2 mole %, 0.5 mole %, or 1.0 mole % aluminum halide coated LMO have at least a 10 mAh/g increase in specific capacity when compared with the pristine LMO, significant decrease in specific capacity were observed for LMO coated with 2.0 mole % aluminum halide. The decrease is more pronounced for $AlCl_3$ and $AlF_3$ than for $AlBr_3$ and $AlI_3$.

Figure 25:
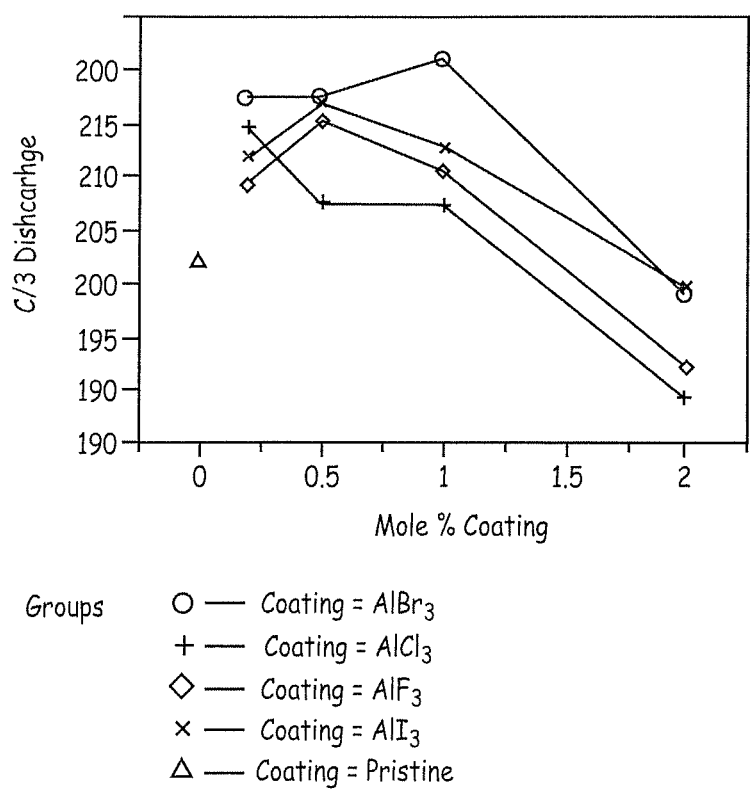
FIG. 25 is a set of plots of specific discharge capacities at 0.33 C discharge rate versus mole % coating of batteries with pristine LMO and LMO coated with various mole percentages of aluminum halides.

Similarly, the specific discharge capacities at discharge rates 0.33 C for batteries with LMO coated with various mole percentages of aluminum halides were compared and the results are shown in FIG. 25. While 0.2 mole %, 0.5 mole %, or 1.0 mole % aluminum halide coated LMO have at least a 5 mAh/g increase in specific capacity when compared with the pristine LMO, significant decrease in specific capacity were observed for LMO coated with 2.0 mole % aluminum halide. The decrease is more pronounced for $AlCl_3$ and $AlF_3$ than for $AlBr_3$ and $AlI_3$.

Figure 26:
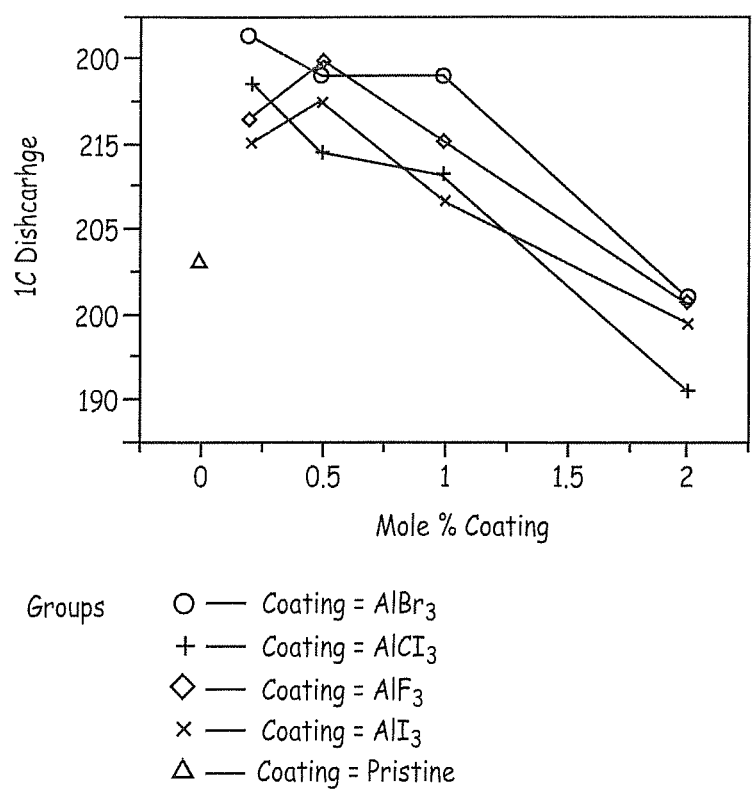
FIG. 26 is a set of plots of specific discharge capacities at 1 C discharge rate versus mole % coating of batteries with pristine LMO and LMO coated with various mole percentages of aluminum halides.

The specific discharge capacities at discharge rates of 1 C for batteries with LMO coated with various mole percentages of aluminum halides were compared and the results are shown in FIG. 26. While 0.2 mole %, 0.5 mole %, or 1.0 mole % aluminum halide coated LMO have at least a 10 mAh/g increase in specific capacity when compared with the pristine LMO, significant decrease in specific capacity were observed for LMO coated with 2.0 mole % aluminum halide. The decrease is more pronounced for $AlCl_3$ than for $AlF_3$, $AlBr_3$, and $AlI_3$.

Figure 27:
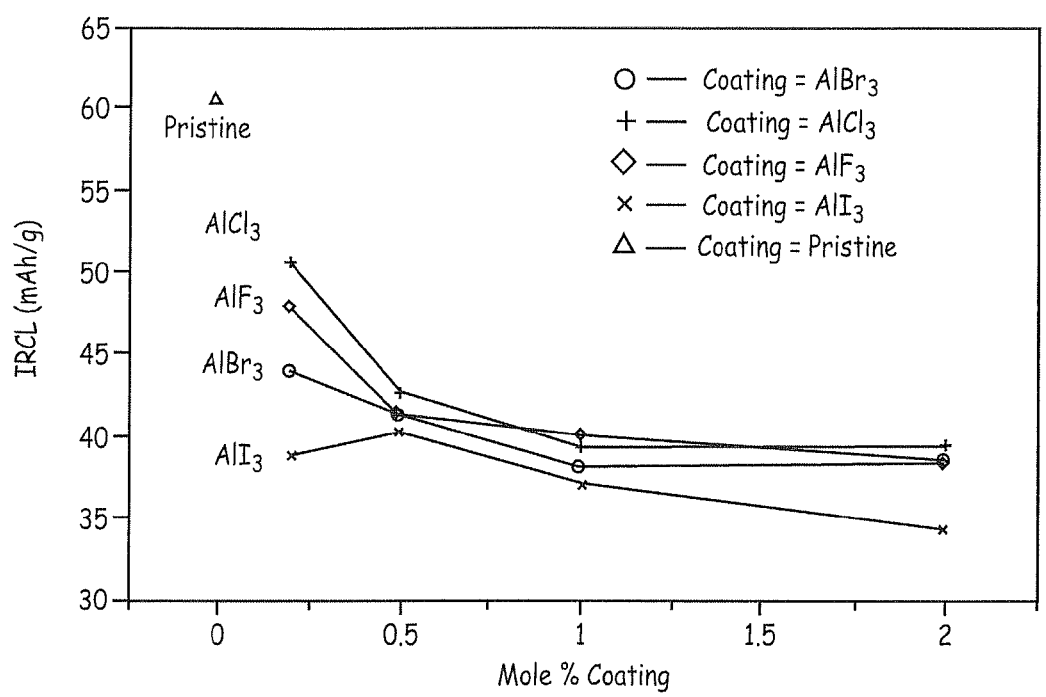
FIG. 27 is a set of plots of the IRCLs versus mole % coating of batteries with pristine LMO and LMO coated with various mole percentages of aluminum halides.

The IRCLs of batteries with LMO coated with various mole percentages of aluminum halides were compared and the results are shown in FIG. 27. Batteries with LMO coated with 0.5 mole % aluminum halide have at least a 15 mAh/g reduction in IRCL when compared with the batteries having pristine LMO. While the reduction in IRCL is comparable for batteries with 0.5 mole %, 1.0 mole %, and 2.0 mole % aluminum halide coated samples, the reduction is less pronounced for batteries with LMO coated with 0.2 mole % aluminum halide. Additionally, the performance of batteries with LMO coated with $AlCl_3$ and $AlF_3$ appear to be more sensitive to the increase in mole percentage than LMO coated with $AlBr_3$ and $AlI_3$.

Figure 28:
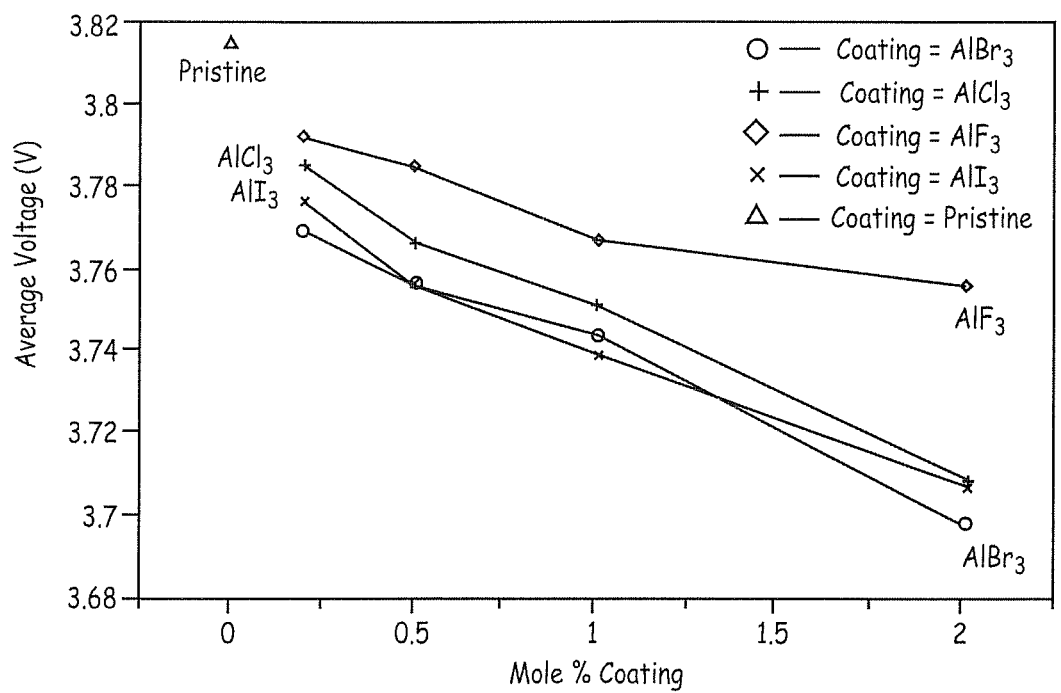
FIG. 28 is a set of plots of the average voltage versus mole % coating for batteries with pristine LMO and LMO coated with various mole percentages of aluminum halides.

The average voltages of batteries formed with LMOs coated with various mole percentages of aluminum halides were compared and the results are shown in FIG. 28. Batteries with LMO coated with 0.2 mole %, 0.5 mole %, and 1.0 mole % aluminum halide generally have less than 3% reduction in average voltage when compared with the pristine LMO. The reduction in average voltage is roughly proportional to the mole percentage aluminum halide coating used, with 2.0 mole % coating showing the most significant reduction.

Figure 29A:
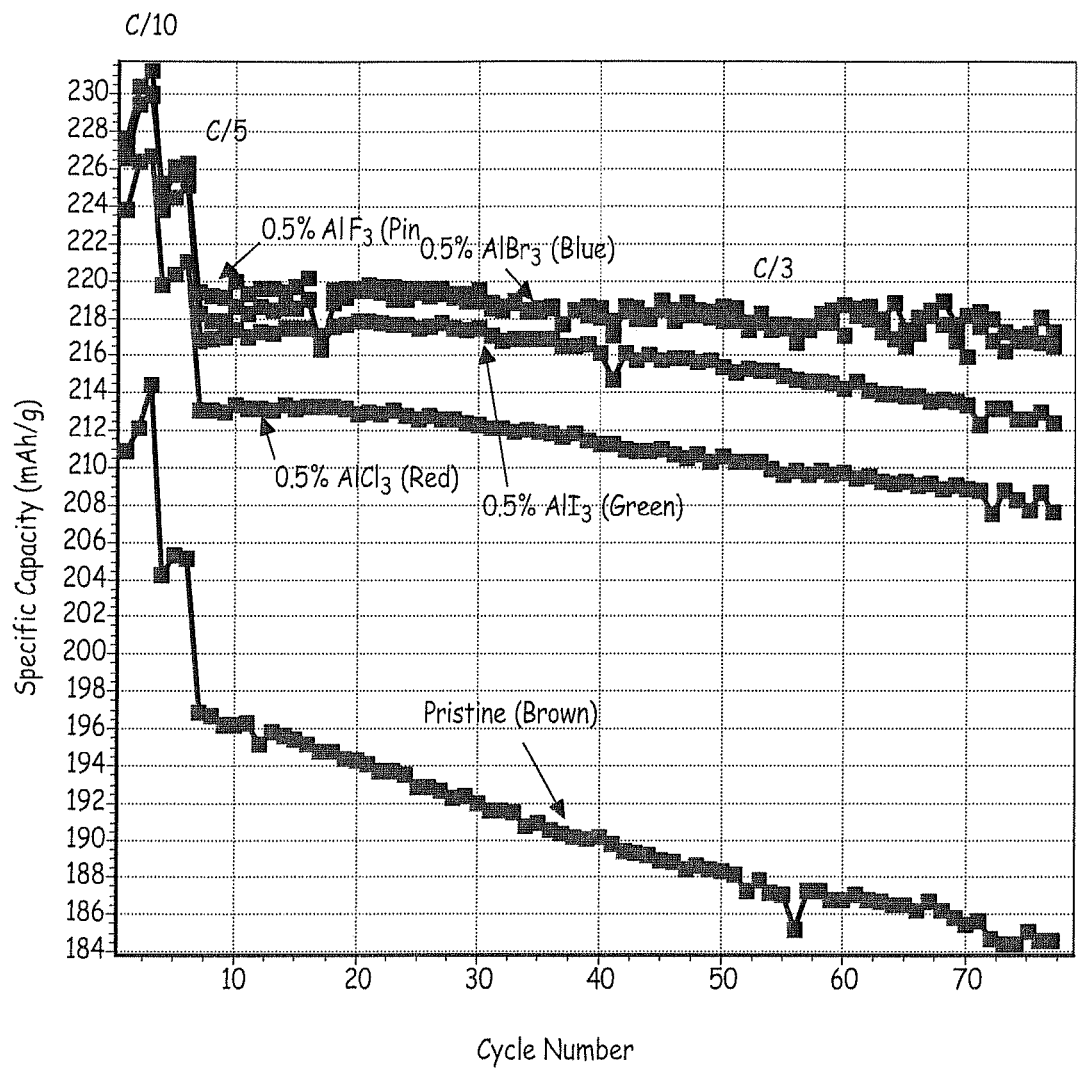
FIG. 29A is a set of plots of specific capacity as a function of cycle number for coin cell batteries with pristine and various aluminum halide coated second LMO composition cycled between 4.6 and 2 volts at 0.1 C for the first three cycles, 0.2 C for cycle numbers 4-6, and 0.33 C for cycles 7-77.
Figure 29B:
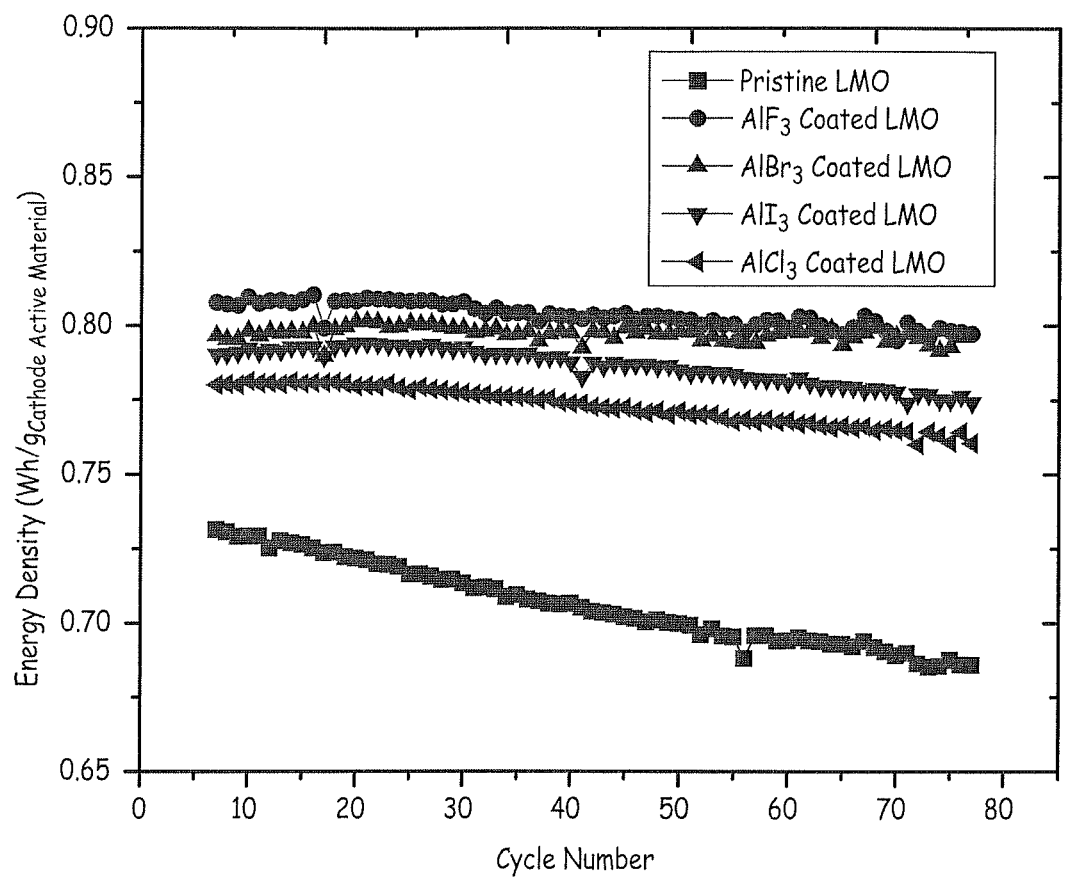
FIG. 29B is a set of plots of energy density as a function of cycle for coin cell batteries as described for FIG. 29A.

Another set of coin cell batteries were tested with respect to longer cycling. The batteries were formed with cathode active materials without a coating or with 0.5 mole percent aluminum halide. For this set of batteries, the batteries were discharged from 4.6 to 2.0 volts for the first three cycles at a rate of C/10, for cycles 4-6 at a rate of C/5 and for cycles 7-77 at a rate of C/3. The specific capacity as a function of cycle number is plotted in FIG. 29A. Corresponding energy densities are plotted in FIG. 29B where the energy density is obtained by multiplying the specific capacity times the average voltage. All of the batteries formed with coated samples exhibited significantly greater specific capacity relative to the batteries formed with uncoated samples. The batteries formed with $AlF_3$ and $AlBr_3$ had comparable capacity performance results out to 77 cycles with the batteries formed with the material having an $AlBr_3$ having a better cycle life efficiency out to 77 cycles. The capacity performance results for these batteries are summarized in Table 5.

TABLE 5

| System | C/10 Discharge (mAh/g) | C/3 Discharge - 7th cycle (mAh/g) | C/3 Discharge - 77th cycle (mAh/g) | C/3 Cycle life efficiency - 7-77th cycle (%) |
| --- | --- | --- | --- | --- |
| Pristine | 211 | 197 | 185 | 93.91 |
| $AlF_3$ | 227 | 219 | 217 | 99.09 |
| $AlBr_3$ | 227 | 218 | 217 | 99.54 |
| $AlI_3$ | 228 | 217 | 212 | 97.70 |
| $AlCl_3$ | 224 | 213 | 208 | 97.65 |

Figure 30:
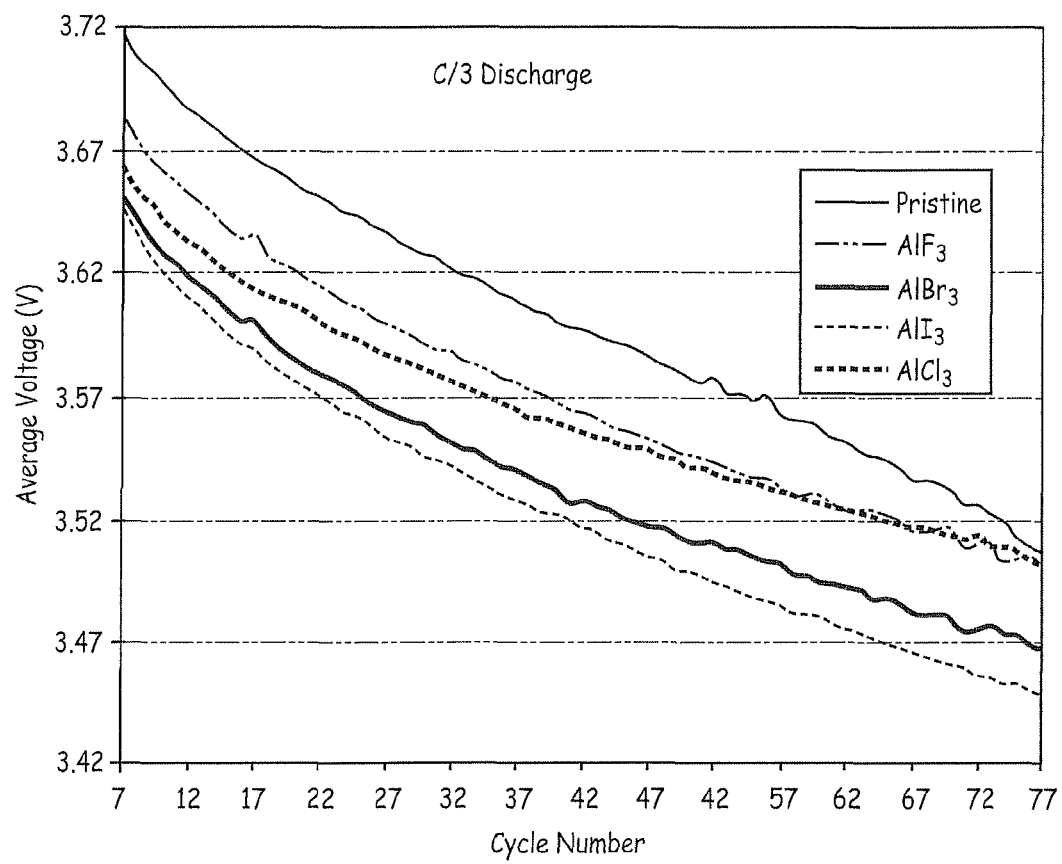
FIG. 30 is a plot of average voltage for the coin cell batteries cycled between 4.6 volts and 2.0 volts as used for the plots in FIG. 27 for cycles 7-77 at a discharge rate of C/3.
Figure 31:
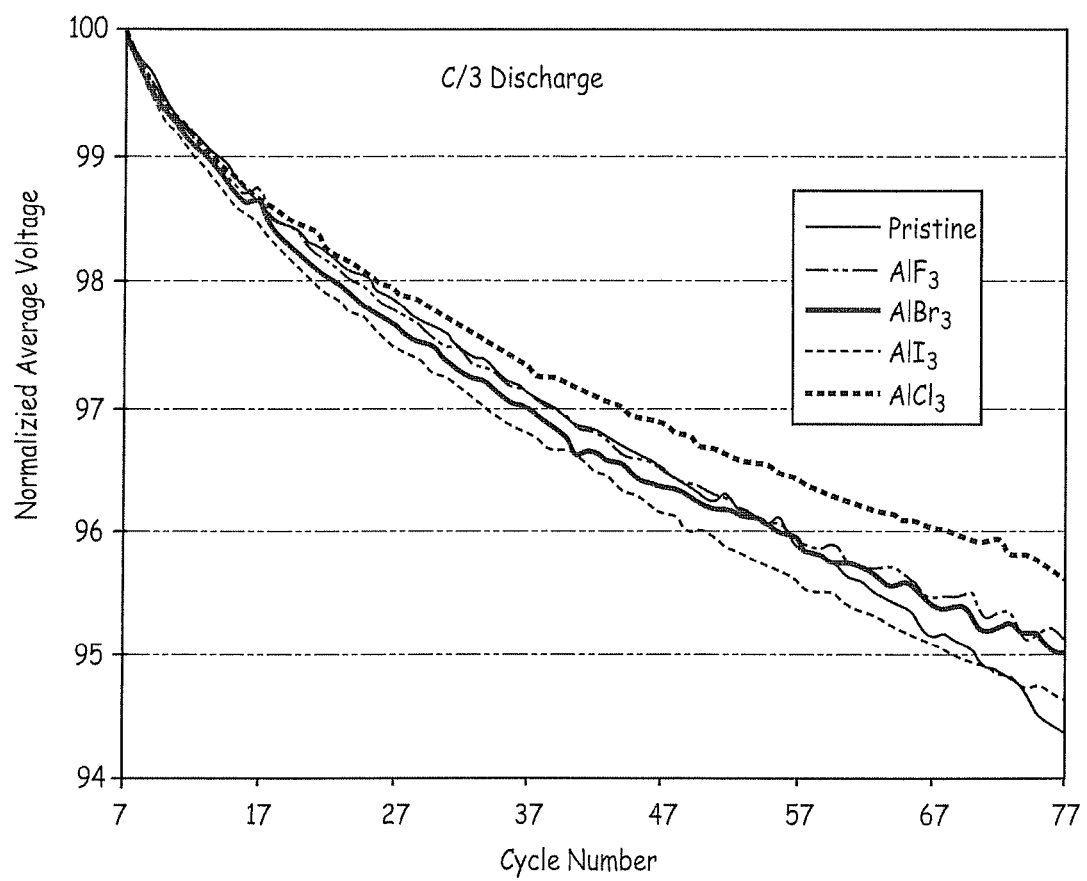
FIG. 31 is a set of plots of the normalized average voltages from FIG. 30.

The average voltages over the cycle for the batteries as a function of cycle are plotted in FIG. 30. The corresponding normalized average voltage is plotted in FIG. 31. The batteries with the uncoated cathode active material cycled with a greater average voltage until reaching higher cycle numbers. The batteries formed with active material having an $AlCl_3$ coating exhibited the least drop in average voltage with cycling over this range.

As indicated by the results outlined above, an aluminum halide coating for the LMO active material can be designed on the desired performance properties of the corresponding battery.

Example 7

Longer Term Cycling

Batteries were tested to evaluate the longer cycling performance with the presence of aluminum halide coatings on the positive electrode active material and with negative electrodes having graphitic carbon active material. The positive electrodes incorporated as an active material on the three compositions noted in Example 1. Powders of the third active composition were coated with aluminum halide coatings as described above in Examples 2 and 5 for the first two active compositions. The powders had a 0.5 mole percent coating as described above.

Coin cells were formed as described above except that the negative electrodes were formed as follows. The negative electrode comprised graphite as the active material. To form the negative electrode, Super P™ acetylene black was mixed with NMP, and PVDF binder (KF9305™ from Kureha Corp., Japan) was added to the NMP and stirred. Graphitic material was added to the solution and stirred. The negative electrode composition was coated onto a copper foil current collector and dried. The negative electrode was then pressed to a desired thickness.

Figures 32, 33:
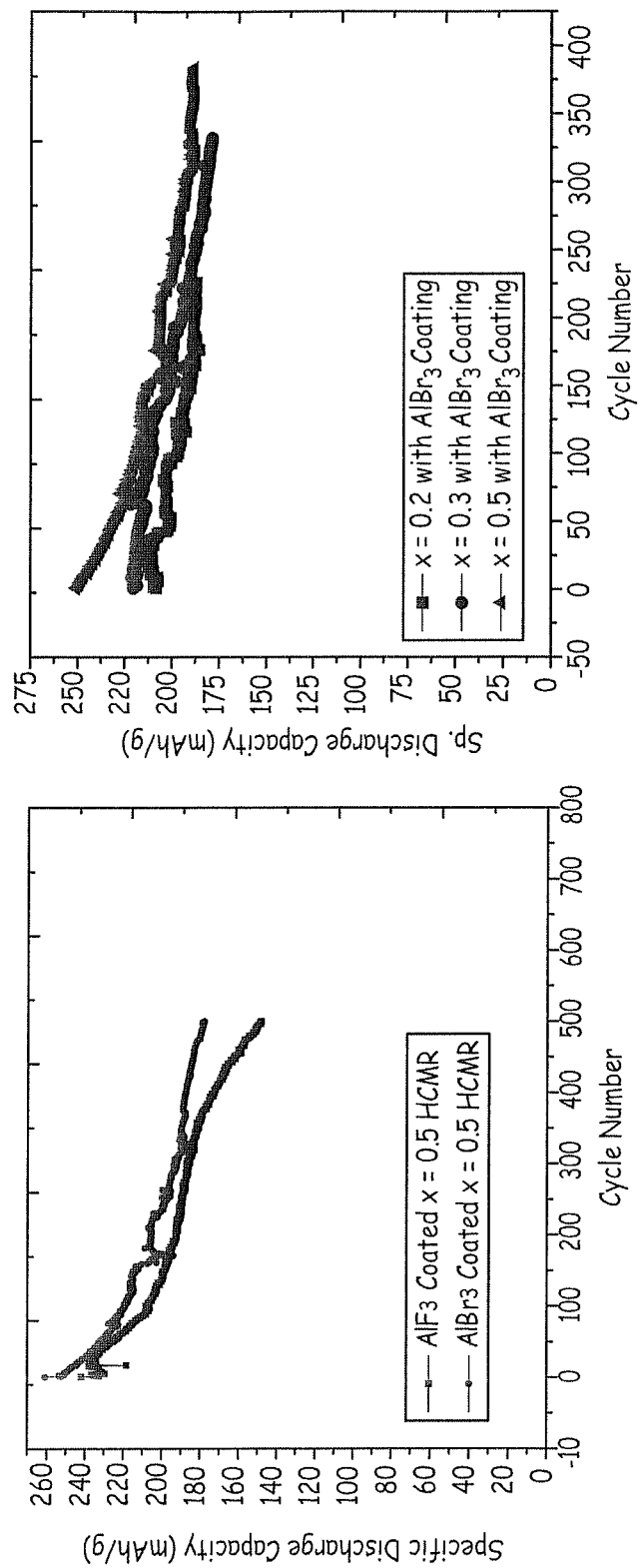
FIG. 32 is a plot of specific discharge capacity for coin cell batteries formed with graphitic carbon anodes and the first positive electrode active compositions with 0.5 mole percent of an $AlBr_3$ or $AlF_3$ coating out to 500 cycles at C/3 cycled from 4.5 to 2 volts.
FIG. 33 is a plot of specific discharge capacity for coin cell batteries formed with graphitic carbon anodes and one of three positive electrode active compositions each having a 0.5 mole percent $AlBr_3$ coating.

The specific discharge capacity results for batteries with the X=0.5 active material with either a $AlF_3$ or $AlBr_3$ coatings are plotted in FIG. 32 out to 500 cycles for cycling from 4.5 to 2.0 volts. The batteries formed with active materials having coatings with the $AlBr_3$ exhibited a greater specific discharge capacity, in which the difference increased to larger values at larger numbers of cycles. The specific capacity as a function of cycles (4.5 to 2.0 volts) is plotted in FIG. 33 for batteries formed with the three different positive electrode active materials each with an $AlBr_3$ coating. The batteries formed with the material having the largest amounts of excess lithium, i.e., X larger, exhibited greater values of specific discharge capacity, but the batteries with larger values of X exhibited somewhat greater fade with cycling, so that indications from extrapolating the plots are that the batteries formed with lower values of X may exhibit greater values of specific capacities for larger cycle numbers.

The embodiments above are intended to be illustrative and not limiting. Additional embodiments are within the inventive concepts. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A lithium ion battery positive electrode material comprising an active composition comprising lithium metal oxide coated with an inorganic coating composition wherein the coating composition comprises a metal chloride, metal bromide, metal iodide, or combinations thereof and having an average voltage of at least about 3.5 volts when discharged from 4.6 volts to 2.0 volts at room temperature at a rate of C/3, wherein the lithium metal oxide is a layered-layered crystalline composition represented by a formula $Li_{1+b}Ni_\alpha Mn_\beta Co_\gamma A_\delta O_2$, where b ranges from about 0.05 to about 0.3, α ranges from 0 to about 0.4, β range from about 0.2 to about 0.65, γ ranges from 0 to about 0.46, and δ ranges from about 0 to about 0.15, and where A is Mg, Sr, Ba, Cd, Zn, Al, Ga, B, Zr, Ti, Ca, Ce, Y, Nb, Cr, Fe, V, Li, or combinations thereof.

2. The positive electrode material of claim 1 wherein the coating composition comprises mono-(non-fluoride) halide of Li, Na, or other monovalent metal cations, di-(non-fluoride)halides of Mg, Zn, Ba, Sr, Ca, or other divalent metal cations, tri-(non-fluoride)halides of Al, Ga, In, or other trivalent metal cations, tetra-(non-fluoride)halides of Zr, Ti, V, or other tetravalent metal cations, penta-(non-fluoride)halides of Ta, Nb, or other pentavalent metal cations, hexa-(non-fluoride)halides of Mo, W, Ru, or other hexa-valent metal cations, or combinations thereof, wherein the non-fluoride halide includes chloride, bromide, iodide, or combinations thereof.

3. The positive electrode material of claim 1 wherein the coating composition comprises $AlCl_3$, $AlBr_3$, $AlI_3$, or combinations thereof.

4. The positive electrode material of claim 1 wherein the coating composition is substantially free of oxygen anions.

5. The positive electrode material of claim 1 wherein the coating composition has an average coating amount from about 0.05 mole percent to about 1 mole percent.

6. The positive electrode material of claim 1 wherein the lithium metal oxide is represented by a formula $Li_{1+b}Ni_\alpha Mn_\beta Co_\gamma O_2$, where b ranges from about 0.05 to about 0.3, α ranges from about 0.1 to about 0.4, β range from about 0.3 to about 0.65, γ ranges from 0.05 to about 0.4, and b+α+β+γ≈1.

7. The positive electrode material of claim 1 wherein the lithium metal oxide is represented by a formula of $xLi_2MnO_3$.

(1−x)LiMO$_2$, where M represents one or more metal ions having an average valance of +3, and 0<x<1.

8. The positive electrode material of claim 1 having a specific discharge capacity of at least about 260 mAh/g with a discharge rate of C/3 when discharged from 4.6V to 2.0 V at room temperature.

9. The positive electrode material of claim 1 having a specific discharge capacity of at least about 245 mAh/g when discharged from 4.6 volts to 2.0 volts at room temperature at a rate of C/3.

10. The positive electrode material of claim 1 wherein the coating composition further comprises metal fluoride.

11. A lithium ion battery comprising
a positive electrode,
a negative electrode comprising a lithium incorporation composition,
a separator between the positive electrode and the negative electrode, and
an electrolyte comprising lithium ions,
wherein the positive electrode comprises an active material, distinct electrically conductive powders, and a polymer binder,
wherein the positive electrode active material comprises an active composition comprising lithium metal oxide coated with a coating composition comprising a metal chloride, metal bromide, metal iodide, or combinations thereof, the lithium metal oxide is a layered-layered crystalline composition represented by a formula Li$_{1+b}$Ni$_\alpha$Mn$_\beta$Co$_\gamma$A$_\delta$O$_2$, where b ranges from about 0.05 to about 0.3, α ranges from 0 to about 0.4, β range from about 0.2 to about 0.65, γ ranges from 0 to about 0.46, and δ ranges from about 0 to about 0.15, and where A is Mg, Sr, Ba, Cd, Zn, Al, Ga, B, Zr, Ti, Ca, Ce, Y, Nb, Cr, Fe, V, Li, or combinations thereof, and the positive electrode active material having an average voltage of at least about 3.5 volts over a discharge from 4.5 to 2 volts at a rate of C/10 and a specific discharge specific capacity of at least about 160 mAh/g at cycle 500 at room temperature at a discharge rate of C/3 from 4.5 volts to 2 volts.

12. The lithium ion battery of claim 11 wherein the coating composition comprises AlCl$_3$, AlBr$_3$, AlI$_3$, or combinations thereof.

13. The lithium ion battery of claim 11 wherein the positive electrode active composition comprises from about 0.025 mole percent to about 5 mole percent the metal chloride, metal bromide, metal iodide, or combinations thereof.

14. The lithium ion battery of claim 11 wherein the lithium metal oxide is represented by a formula of xLi2MnO3.LiMnO$_2$, where M represents one or more metal ions having an average valance of +3, and 0<x<1.

15. The lithium ion battery of claim 14 wherein 0.1≤x≤0.45.

16. The lithium ion battery of claim 11 wherein the lithium ion battery has a first cycle irreversible capacity loss that is reduced by at least about 25% relative to the irreversible capacity loss of a battery formed with an uncoated lithium metal oxide.

17. The lithium ion battery of claim 11 wherein the positive electrode active material having a discharge specific capacity of at least about 170 mAh/g at cycle 500 at a discharge rate of C/3 from 4.5 volts to 2 volts.

18. The lithium ion battery of claim 11 wherein the coating composition is substantially free of oxygen anions.

19. The lithium ion battery of claim 11 wherein the coating composition has an average coating amount from about 0.05 mole percent to about 1 mole percent.

20. The lithium ion battery of claim 11 wherein the lithium metal oxide is represented by a formula Li$_{1+b}$Ni$_\alpha$Mn$_\beta$Co$_\delta$O$_2$, where b ranges from about 0.05 to about 0.3, α ranges from about 0.1 to about 0.4, β range from about 0.3 to about 0.65, γ ranges from 0.05 to about 0.4, and b+α+β+γ≈1.

21. The lithium ion battery of claim 11 wherein the positive electrode active material has a specific discharge capacity of at least about 245 mAh/g when discharged from 4.6 volts to 2.0 volts at room temperature at a rate of C/3.

22. The lithium ion battery of claim 11 wherein the positive electrode active material has an average voltage of at least about 3.65 at room temperature at a discharge rate of C/3 from 4.5 volts to 2 volts.

23. A method for making a positive electrode material coated with a metal/metalloid halide, the method comprising:
milling a powder of the positive electrode material with a selected amount of a powder of the metal/metalloid halide to coat the positive electrode material with the metal/metalloid halide to form the positive electrode active material of claim 1.

* * * * *